US 009574589B2

(12) United States Patent
Knutson et al.

(10) Patent No.: US 9,574,589 B2
(45) Date of Patent: Feb. 21, 2017

(54) TRAPEZE HANGER SYSTEM INCLUDING TRAPEZE HANGER FITTING

(71) Applicant: Cooper Technologies Company, Houston, IL (US)

(72) Inventors: James A. Knutson, Collinsville, IL (US); Zhihui Zhang, Edwardsville, IL (US)

(73) Assignee: Cooper Technologies Company, Houston, TX (US)

( * ) Notice: Subject to any disclaimer, the term of this patent is extended or adjusted under 35 U.S.C. 154(b) by 27 days.

(21) Appl. No.: 14/701,079

(22) Filed: Apr. 30, 2015

(65) Prior Publication Data

US 2015/0316177 A1 Nov. 5, 2015

Related U.S. Application Data

(60) Provisional application No. 61/987,894, filed on May 2, 2014, provisional application No. 61/986,571, filed on Apr. 30, 2014.

(51) Int. Cl.
*F16L 3/00* (2006.01)
*F16B 7/04* (2006.01)
(Continued)

(52) U.S. Cl.
CPC . *F16B 7/04* (2013.01); *F16L 3/24* (2013.01); *F16M 13/02* (2013.01); *F16M 13/027* (2013.01);
(Continued)

(58) Field of Classification Search
CPC ............. F16B 7/04; F16B 7/0473; F16L 3/24; F16M 13/02; F16M 13/027; Y10T 29/49828
(Continued)

(56) References Cited

U.S. PATENT DOCUMENTS 1,813,545 A 7/1931 Reinhold
1,934,760 A 11/1933 Awbrey
(Continued)

FOREIGN PATENT DOCUMENTS

CN 202416847 U 9/2012
DE 7701100 5/1977
(Continued)

OTHER PUBLICATIONS

Power-Strut Engineering Catalog, Tyco International. 2008, retrieved on Jan. 5, 2016, http://www.power-strut.com/DB/PDF1/Power-Strut-Catalog_2008.pdf, pp. 63, 65.
(Continued)

*Primary Examiner* — Adriana Figueroa
(74) *Attorney, Agent, or Firm* — Senniger Powers LLP

(57) ABSTRACT

A trapeze hanger fitting includes a strut connecting portion configured for insertion into an open interior of a strut through an open longitudinal end of the strut to connect the trapeze hanger fitting to the strut. A rod securement portion is connected to the strut connecting portion and configured for securement to a rod to secure the trapeze hanger fitting to the rod. The rod securement portion is configured to be disposed outside the open interior of the strut and longitudinally outward from the open longitudinal end of the strut when the strut connecting portion is inserted into the open interior of the strut.

11 Claims, 20 Drawing Sheets

(51) Int. Cl.
*F16M 13/02* (2006.01)
*F16L 3/24* (2006.01)

(52) U.S. Cl.
CPC ......... *F16B 7/0473* (2013.01); *Y10T 29/49828* (2015.01)

(58) Field of Classification Search
USPC .......................................................... 248/59
See application file for complete search history.

(56) References Cited

U.S. PATENT DOCUMENTS

| | | | |
|---|---|---|---|
| 1,963,908 A | 6/1934 | Manasek | |
| 2,307,653 A | 1/1943 | Wright | |
| 2,375,513 A * | 5/1945 | Bach .................. | F16L 3/221 |
| | | | 248/59 |
| 2,420,826 A | 5/1947 | Irrgang | |
| 2,470,991 A | 5/1949 | Kindorf et al. | |
| 2,767,609 A | 10/1956 | Cousino | |
| 2,767,951 A | 10/1956 | Cousino | |
| 2,846,169 A | 8/1958 | Sulllivan | |
| 3,226,069 A | 12/1965 | Clarke | |
| 3,310,264 A | 3/1967 | Appleton | |
| 3,312,034 A | 4/1967 | Steinmann | |
| 3,396,499 A | 8/1968 | Biffani | |
| 3,417,951 A | 12/1968 | Rebentisch, Jr. | |
| 3,451,183 A | 6/1969 | Lespagnol et al. | |
| 3,463,428 A | 8/1969 | Kindorf et al. | |
| 3,486,726 A | 12/1969 | Kindorf et al. | |
| 3,513,606 A | 5/1970 | Jones | |
| 3,527,432 A | 9/1970 | Lytle | |
| 3,547,385 A | 12/1970 | Kindorf | |
| 3,566,561 A | 3/1971 | Tozer | |
| 3,592,493 A | 7/1971 | Goose | |
| 3,601,347 A | 8/1971 | Attwood | |
| 3,612,461 A | 10/1971 | Brown | |
| 3,650,499 A | 3/1972 | Biggane | |
| 3,752,198 A | 8/1973 | Fiorentino et al. | |
| 3,757,485 A | 9/1973 | Vincens | |
| 3,944,308 A | 3/1976 | Persson | |
| 3,986,314 A | 10/1976 | Moeller | |
| 3,998,419 A | 12/1976 | Semmerling | |
| 4,044,428 A | 8/1977 | Kowalski | |
| 4,185,802 A | 1/1980 | Myles et al. | |
| 4,211,381 A | 7/1980 | Heard | |
| 4,216,930 A | 8/1980 | Rossler, Jr. et al. | |
| 4,227,355 A | 10/1980 | Wendt | |
| 4,358,216 A | 11/1982 | Pleickhardt et al. | |
| 4,379,651 A | 4/1983 | Nagashima | |
| 4,417,711 A * | 11/1983 | Madej .................. | F16L 3/1041 |
| | | | 248/74.4 |
| 4,479,341 A | 10/1984 | Schuplin | |
| 4,490,064 A | 12/1984 | Ducharme | |
| 4,516,296 A | 5/1985 | Sherman | |
| 4,610,562 A | 9/1986 | Dunn | |
| 4,637,748 A | 1/1987 | Beavers | |
| 4,657,458 A | 4/1987 | Wollar et al. | |
| 4,708,554 A | 11/1987 | Howard | |
| 4,726,165 A | 2/1988 | Brinsa | |
| 4,830,531 A * | 5/1989 | Condit .................. | F16B 37/045 |
| | | | 403/348 |
| 4,948,313 A | 8/1990 | Zankovich | |
| 4,950,099 A | 8/1990 | Roellin | |
| 4,961,553 A | 10/1990 | Todd | |
| 5,022,614 A | 6/1991 | Rinderer | |
| D322,929 S | 1/1992 | Abbestam et al. | |
| 5,102,074 A * | 4/1992 | Okada .................. | F16L 3/24 |
| | | | 248/59 |
| 5,141,186 A | 8/1992 | Cusic | |
| 5,146,724 A | 9/1992 | Angelo | |
| 5,163,644 A | 11/1992 | Kowalski | |
| 5,175,971 A | 1/1993 | McCombs | |
| 5,228,263 A | 7/1993 | Vaughn | |
| 5,271,586 A | 12/1993 | Schmidt | |
| 5,335,890 A | 8/1994 | Pryor et al. | |
| 5,351,926 A | 10/1994 | Moses | |
| 5,375,798 A | 12/1994 | Hungerford, Jr. | |
| 5,489,173 A | 2/1996 | Hofle | |
| 5,503,511 A | 4/1996 | Flamme | |
| 5,595,363 A | 1/1997 | De Leebeeck | |
| 5,628,508 A | 5/1997 | Koole | |
| 5,628,598 A | 5/1997 | Höfle | |
| 5,655,865 A | 8/1997 | Plank et al. | |
| 5,729,948 A | 3/1998 | Levy et al. | |
| 5,746,535 A | 5/1998 | Kohler | |
| 5,779,412 A | 7/1998 | Nagai et al. | |
| 5,799,452 A | 9/1998 | Moore | |
| 5,799,907 A | 9/1998 | Andronica | |
| 5,806,268 A | 9/1998 | Koller | |
| 5,806,897 A | 9/1998 | Nagai et al. | |
| 5,820,322 A | 10/1998 | Hermann et al. | |
| 5,855,342 A | 1/1999 | Hawkins et al. | |
| 5,864,997 A | 2/1999 | Kelly | |
| 5,918,999 A | 7/1999 | Lamarca | |
| 5,924,650 A | 7/1999 | Richichi | |
| 5,927,041 A | 7/1999 | Sedlmeier et al. | |
| 5,984,243 A | 11/1999 | Pfaller et al. | |
| 5,988,930 A | 11/1999 | Liebetrau et al. | |
| 6,061,984 A | 5/2000 | Rose | |
| 6,062,764 A | 5/2000 | Rixen et al. | |
| 6,195,953 B1 | 3/2001 | Gitter et al. | |
| 6,322,030 B1 | 11/2001 | Marra | |
| 6,484,358 B1 | 11/2002 | Duong et al. | |
| 6,494,415 B1 * | 12/2002 | Roth .................. | F16L 3/24 |
| | | | 248/62 |
| 6,572,057 B1 * | 6/2003 | Roth .................. | F16L 3/133 |
| | | | 248/217.2 |
| 6,655,099 B1 | 12/2003 | Trenoweth | |
| 6,660,938 B2 | 12/2003 | Herb et al. | |
| 6,679,461 B1 | 1/2004 | Hawkins | |
| 6,682,253 B2 | 1/2004 | Binna et al. | |
| 6,712,543 B1 | 3/2004 | Schmalzhofer | |
| 6,726,117 B2 | 4/2004 | Herb et al. | |
| 6,751,914 B2 | 6/2004 | Zeh et al. | |
| 7,014,213 B1 | 3/2006 | Kaiser | |
| 7,044,701 B2 | 5/2006 | Herb | |
| 7,096,641 B2 | 8/2006 | Birnbaum et al. | |
| 7,179,010 B2 | 2/2007 | Weger et al. | |
| 7,240,884 B2 | 7/2007 | Shim | |
| 7,287,733 B2 | 10/2007 | Bongio et al. | |
| 7,389,621 B2 | 6/2008 | Hawes | |
| 7,448,822 B2 | 11/2008 | Nebeker et al. | |
| 7,478,787 B2 | 1/2009 | Bankston et al. | |
| 7,484,697 B1 | 2/2009 | Nelson | |
| 7,600,724 B2 | 10/2009 | Nelson et al. | |
| 7,604,444 B2 | 10/2009 | Wu | |
| 7,661,915 B2 | 2/2010 | Whipple | |
| 7,818,925 B2 | 10/2010 | Benedict | |
| 7,922,130 B2 | 4/2011 | Hawkins | |
| 7,922,417 B2 | 4/2011 | Jimenez | |
| 7,984,601 B2 | 7/2011 | Bimbaum et al. | |
| 8,100,600 B2 | 1/2012 | Blum | |
| 8,225,581 B2 | 7/2012 | Strickland et al. | |
| 8,303,223 B2 | 11/2012 | Rass et al. | |
| 8,341,913 B2 | 1/2013 | Meres et al. | |
| 8,366,340 B2 | 2/2013 | Munakata et al. | |
| 8,454,259 B2 | 6/2013 | Oetlinger | |
| 8,465,242 B2 | 6/2013 | Arendt et al. | |
| 8,511,929 B2 | 8/2013 | Raye et al. | |
| 8,523,923 B2 | 9/2013 | Thomke et al. | |
| 8,567,030 B2 * | 10/2013 | Koch .................. | F16B 2/12 |
| | | | 29/281.1 |
| 8,596,009 B2 | 12/2013 | Baxter et al. | |
| 8,661,765 B2 | 3/2014 | Schaefer et al. | |
| 8,662,455 B2 | 3/2014 | Hernandez et al. | |
| 8,695,296 B2 | 4/2014 | Bergman | |
| D728,753 S | 5/2015 | Hikoyama | |
| 9,187,898 B1 | 11/2015 | Underkofler et al. | |
| 9,194,418 B2 | 11/2015 | Parthibhan et al. | |
| 2002/0000498 A1 | 1/2002 | Workman | |
| 2002/0060280 A1 | 5/2002 | Yaphe et al. | |
| 2002/0110435 A1 | 8/2002 | Herb et al. | |
| 2002/0122691 A1 | 9/2002 | Wood | |
| 2003/0042033 A1 | 3/2003 | Herb et al. | |

(56) References Cited

U.S. PATENT DOCUMENTS

| | | | |
|---|---|---|---|
| 2003/0043033 A1 | 3/2003 | Lee | |
| 2003/0063961 A1 | 4/2003 | Lay | |
| 2003/0122044 A1 | 7/2003 | Unverzagt et al. | |
| 2003/0159397 A1 | 8/2003 | Birnbaum | |
| 2004/0165943 A1 | 8/2004 | Herb | |
| 2004/0165947 A1 | 8/2004 | Herb | |
| 2004/0165965 A1 | 8/2004 | Unverzagt et al. | |
| 2004/0228681 A1 | 11/2004 | Herb | |
| 2005/0116123 A1 | 6/2005 | Bailey et al. | |
| 2005/0129458 A1 | 6/2005 | Hoffmann | |
| 2006/0027715 A1 | 2/2006 | Dinh et al. | |
| 2006/0038398 A1 | 2/2006 | Whipple et al. | |
| 2007/0040075 A1 | 2/2007 | Moretto | |
| 2007/0075213 A1* | 4/2007 | Foser | E04C 2/428 248/547 |
| 2007/0101670 A1 | 5/2007 | Ahren et al. | |
| 2007/0120036 A1 | 5/2007 | Olle et al. | |
| 2007/0145222 A1 | 6/2007 | Rausch | |
| 2007/0248793 A1 | 10/2007 | Herb et al. | |
| 2008/0229699 A1 | 9/2008 | Nehls | |
| 2010/0102011 A1 | 4/2010 | Blum | |
| 2010/0193645 A1 | 8/2010 | Merhar et al. | |
| 2012/0110788 A1 | 5/2012 | Chen | |
| 2012/0119037 A1 | 5/2012 | Azuma et al. | |
| 2012/0286110 A1* | 11/2012 | Hill | F16L 3/13 248/74.2 |
| 2012/0297723 A1* | 11/2012 | Siddiqui | F16L 3/24 52/698 |
| 2012/0315106 A1 | 12/2012 | Amedt et al. | |
| 2014/0042286 A1 | 2/2014 | Jaffari | |
| 2014/0091050 A1 | 4/2014 | Zhang | |
| 2014/0093307 A1 | 4/2014 | Zhang | |
| 2014/0097304 A1 | 4/2014 | Mastro | |
| 2014/0197284 A1 | 7/2014 | Hikoyama | |
| 2014/0283475 A1 | 9/2014 | Zhang et al. | |
| 2015/0276092 A1 | 10/2015 | Oliver et al. | |

FOREIGN PATENT DOCUMENTS

| | | | |
|---|---|---|---|
| DE | 8232700 U1 | 6/1983 | |
| DE | 3513382 A1 | 10/1986 | |
| DE | 8704502 U1 | 7/1987 | |
| DE | 102006035405 A1 | 5/2008 | |
| DE | 202010004406 U1 | 7/2010 | |
| DE | 102009000603 A1 | 9/2010 | |
| DE | 202012102394 | * 7/2012 | F16L 3/24 |
| EP | 0592743 A1 | 4/1994 | |
| GB | 569377 | 5/1945 | |
| GB | 687403 | 2/1953 | |
| GB | 1157545 | 7/1969 | |
| GB | 1370645 | 10/1974 | |
| JP | 2000139583 | 5/2000 | |
| WO | 9837349 A1 | 8/1998 | |
| WO | 2013125821 A1 | 8/2013 | |
| WO | 2014159372 A1 | 10/2014 | |

OTHER PUBLICATIONS

Unistrut General Engineering Catalog. Catalog [online]. Unistrut Corporation. Mar. 1, 1998, retrieved on Jan. 5, 2016, http://www.unistrut.us/DB/PDF_Archive/No_12.pdf, pp. 117, 118.

Drawing of MQM Wing Nut, (at least as early as Mar. 13, 2012), (1) pg.

Hilti MI/MZ Technical Guide, 4.2 MQ System Components—Load Data and Material Specifications, MQM Wing Nut, (at least as early as Mar. 13, 2012), 1 page, www.us.hilti.com, Canada.

Unistrut, P1000® & P1001 Channels, (at least as early as Mar. 13, 2012), 1 page.

Unistrut, P1100® & P1101 Channels, (at least as early as Mar. 13, 2012), 1 page.

Unistrut, P2000® & P2001 Channels, (at least as early as Mar. 13, 2012), 1 page.

Unistrut, Channels Nuts, Top Retainer Nut, (at least as early as Mar. 13, 2012), 1 page.

Power-Strut Engineering Catalog, Pictorial Table of Contents, (at least as early as Mar. 13, 2012), pp. 11-14, www.alliedeg.com.

B-Line by Eaton—Channel Nuts & Hardware, Strut Systems, (at least as early as Mar. 13, 2012), pp. 45-53.

* cited by examiner

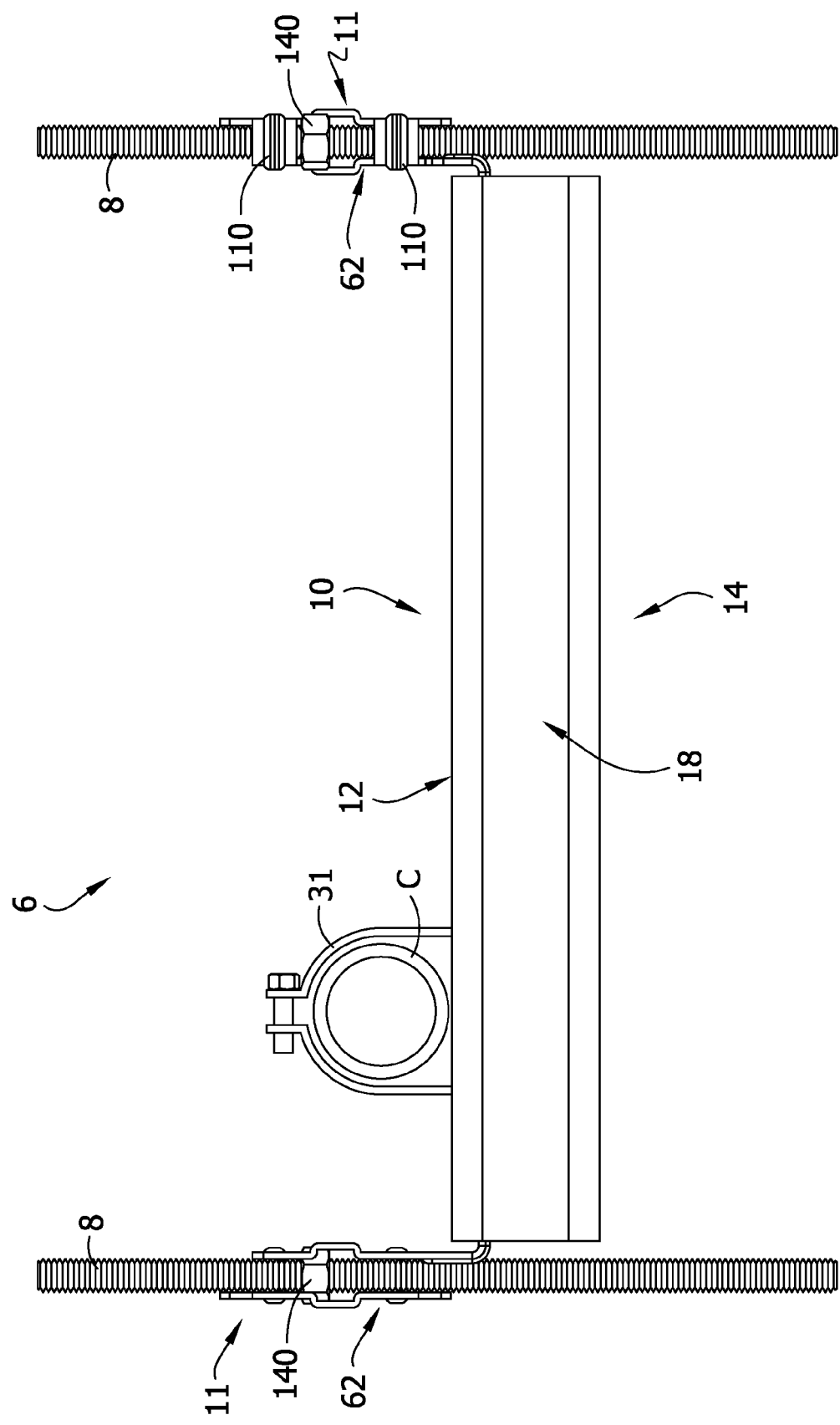

TRAPEZE HANGER SYSTEM INCLUDING TRAPEZE HANGER FITTING

FIELD OF THE DISCLOSURE

The present invention generally relates to a trapeze hanger system, and a fitting of the trapeze hanger system.

BACKGROUND

Pipes, electrical cables and other components in buildings may be secured to a support extending down from an elevated structure, such as a ceiling. For example, a trapeze hanger system may be used to support one or more pipes and/or electrical cables (or other components) within a building. In one example, a trapeze hanger system includes one or more struts, each of which is secured to threaded rods depending from a ceiling. The strut is typically a channel strut including an upper side defining an open channel and a lower side having openings therein. Each threaded rod passes through the open channel in the upper side and one of the openings in the lower side. Nut/washer sets are used to secure the strut to the threaded rods. In particular, an upper nut/washer set and a lower nut/washer set are secured to each rod (i.e., the nuts are threaded on the rods), such that the strut is sandwiched between the upper and lower nut/washer sets to fixedly secure the strut to the threaded rod. When secured to the rods, the strut is spaced from the ceiling in a generally horizontal orientation. The pipes and/or electrical cables may be secured to the upper side of the strut, such as by pipe clamps secured in the open channel from the strut, so that the pipes and/or electrical cables run horizontally in the building.

Although the conventional trapeze hanger system works quite well for suspending components from an elevated structure, it can be time consuming to assembly the trapeze hanger system on site. Moreover, depending on the lengths of the strut used in the trapeze hanger system, it may require at least two installers to assemble the trapeze hanger system on site, which adds to the overall cost of installing.

SUMMARY OF THE DISCLOSURE

In one aspect, a trapeze hanger fitting includes a strut connecting portion configured for insertion into an open interior of a strut through an open longitudinal end of the strut to connect the trapeze hanger fitting to the strut. A rod securement portion is connected to the strut connecting portion and configured for securement to a rod to secure the trapeze hanger fitting to the rod. The rod securement portion is configured to be disposed outside the open interior of the strut and longitudinally outward from the open longitudinal end of the strut when the strut connecting portion is inserted into the open interior of the strut.

In another aspect, a trapeze hanger system includes a strut having an upper side, a lower side, an interior surface defining an open interior, and opposite open longitudinal ends leading to the open interior. A trapeze hanger fitting for securing the strut to a rod includes a strut connecting portion configured for insertion into the open interior of the strut through one of the open longitudinal ends of the strut to connect the trapeze hanger fitting to the strut. A rod securement portion is connected to the strut connecting portion and configured for securement to the rod to secure the trapeze hanger fitting to the rod. The rod securement portion is configured to be disposed outside the open interior of the strut and longitudinally outward from said one of the open longitudinal ends of the strut when the strut connecting portion is inserted into the open interior of the strut.

In yet another aspect, a method of forming a trapeze hanger system includes securing a rod securement portion of a first trapeze hanger fitting to a rod. A strut connecting portion of the first trapeze hanger fitting is inserted into an open interior of a strut through an open longitudinal end of the strut. The rod securement portion of the first trapeze hanger fitting is disposed outside the open interior of the strut and longitudinally outward from the open longitudinal end of the strut after inserting the strut connecting portion into the open interior of the strut.

Other features will be in part apparent and in part pointed out hereinafter.

BRIEF DESCRIPTION OF THE DRAWINGS

FIG. 20 is an elevation of FIG. 19, including a component secured to the strut.

Corresponding reference characters indicate corresponding parts throughout the drawings.

DETAILED DESCRIPTION

Figure 1:
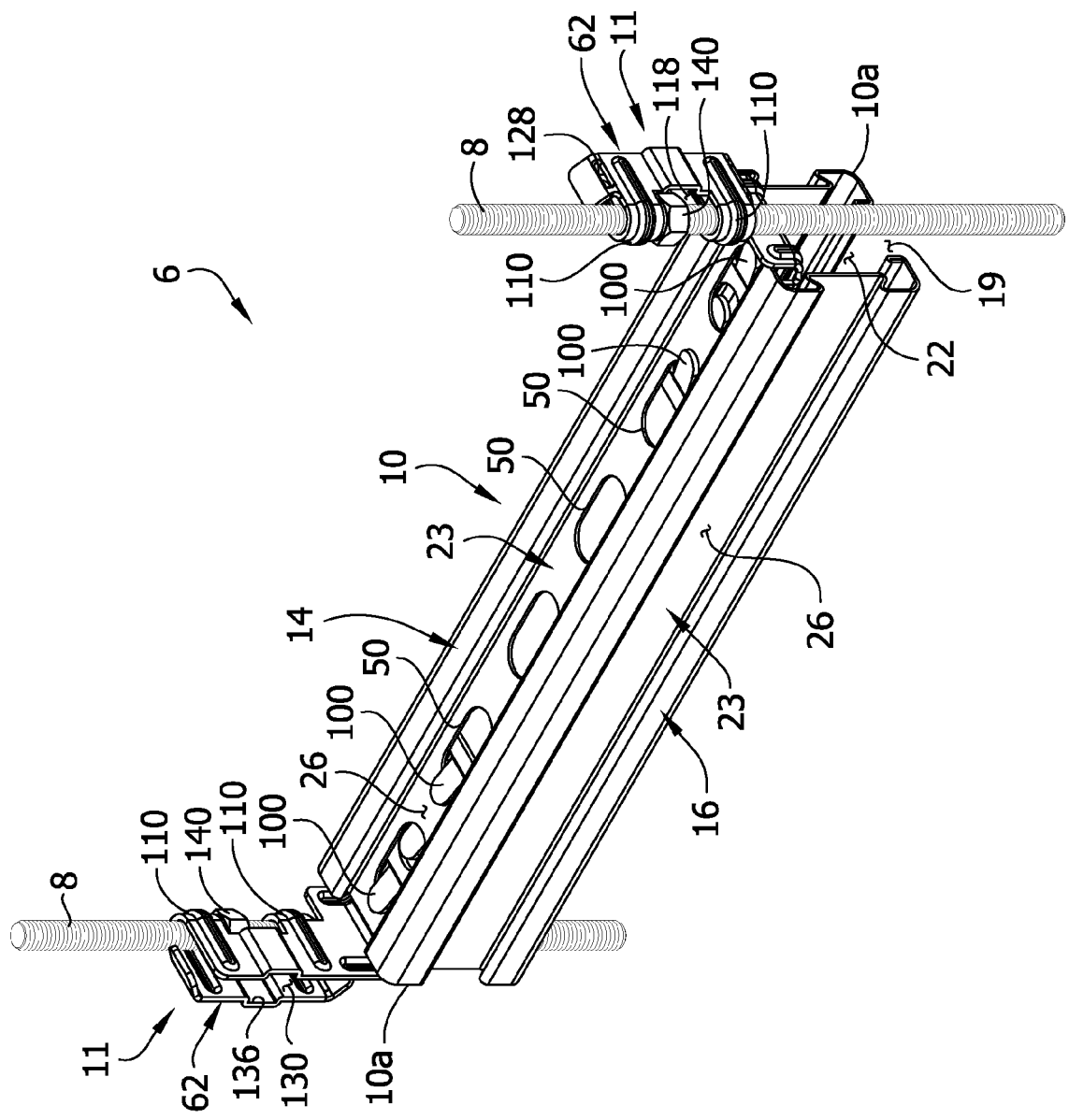
FIG. 1 is a front perspective of one embodiment of an assembled trapeze hanger system, the system including a strut, a pair of threaded rods, and a pair of trapeze hanger fittings received in a lower T-shaped track of the strut.
Figure 2:
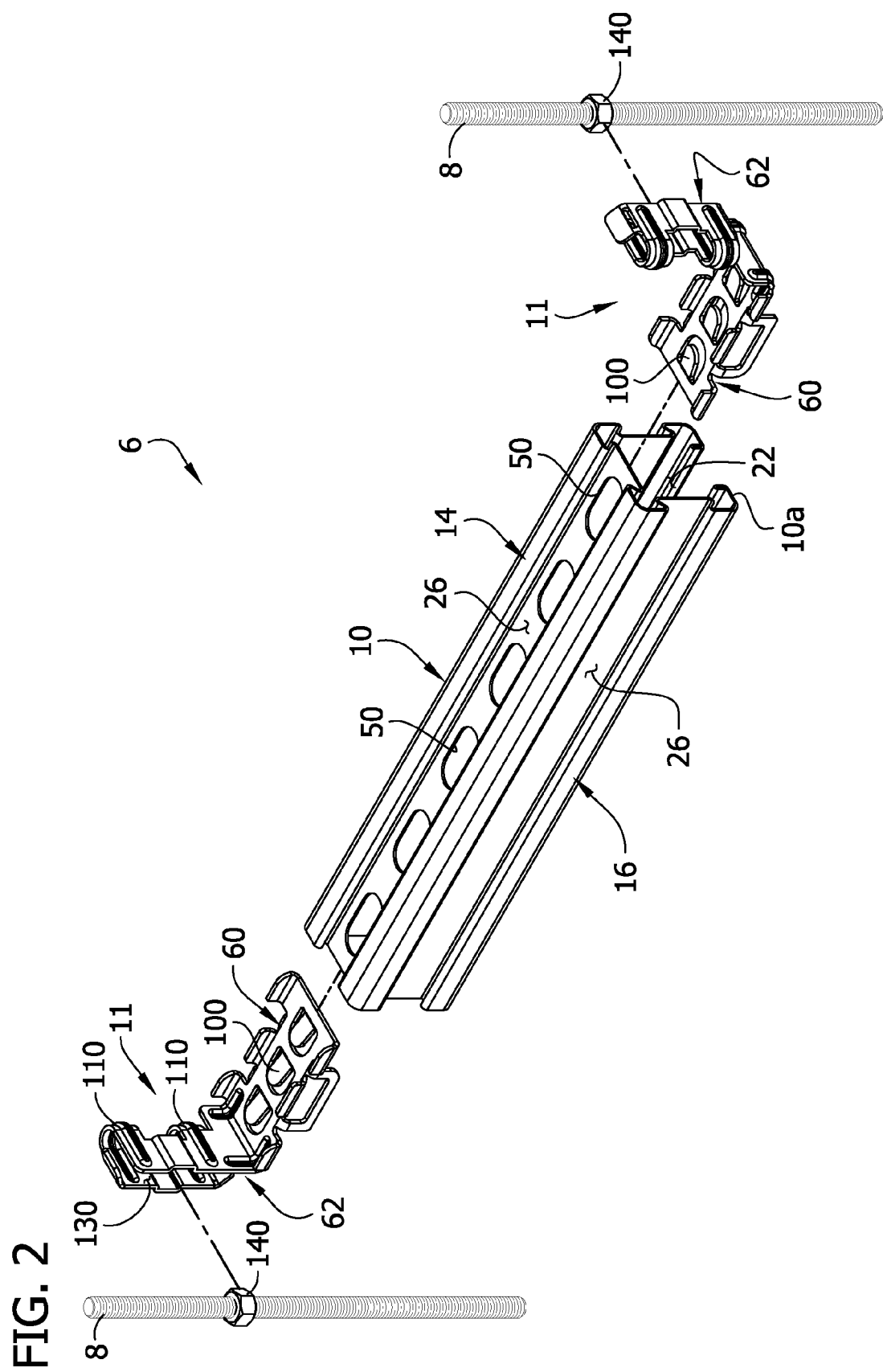
FIG. 2 is an exploded view of the trapeze hanger system.

Referring to FIGS. 1 and 2, the present disclosure is directed to a trapeze hanger system, one embodiment of which is indicated generally at reference numeral 6. The trapeze hanger system 6 includes rods 8 (e.g., two threaded rods), a strut, generally indicated at reference numeral 10, and hanger fittings, each generally indicated at 11, for securing the strut to the threaded rods. In general, the trapeze hanger system 6 is used to support one or more components (e.g., pipes, electrical cables, cable trays, and the like) within a building, for example, or other structure. As explained in more detail below, in use the trapeze hanger system 6 is suspended from an elevated structure (e.g., a ceiling) and components may be supported by and secured to the strut 10.

Figure 3:
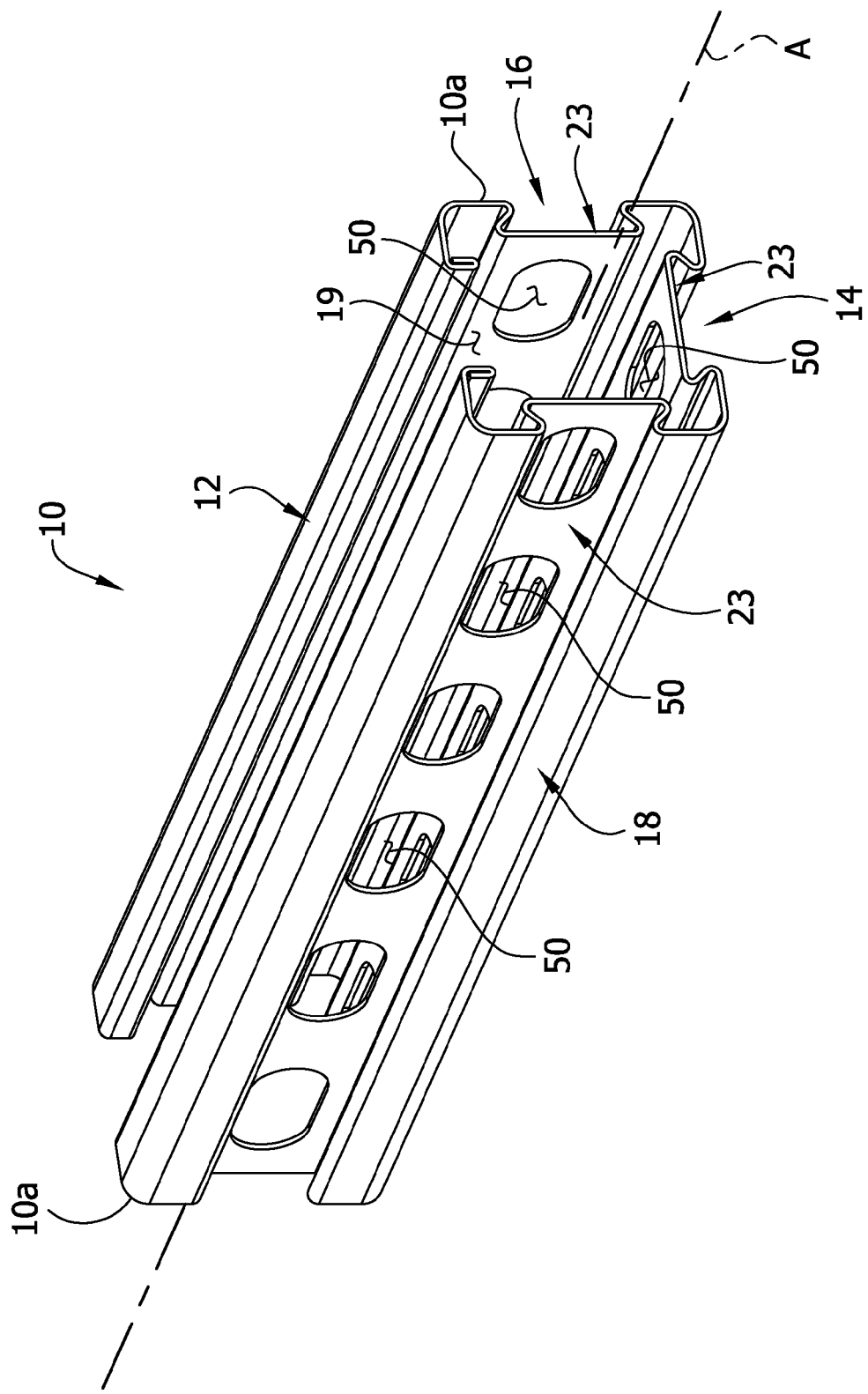
FIG. 3 is a front perspective of one embodiment of a strut for use in the trapeze hanger system.
Figure 4:
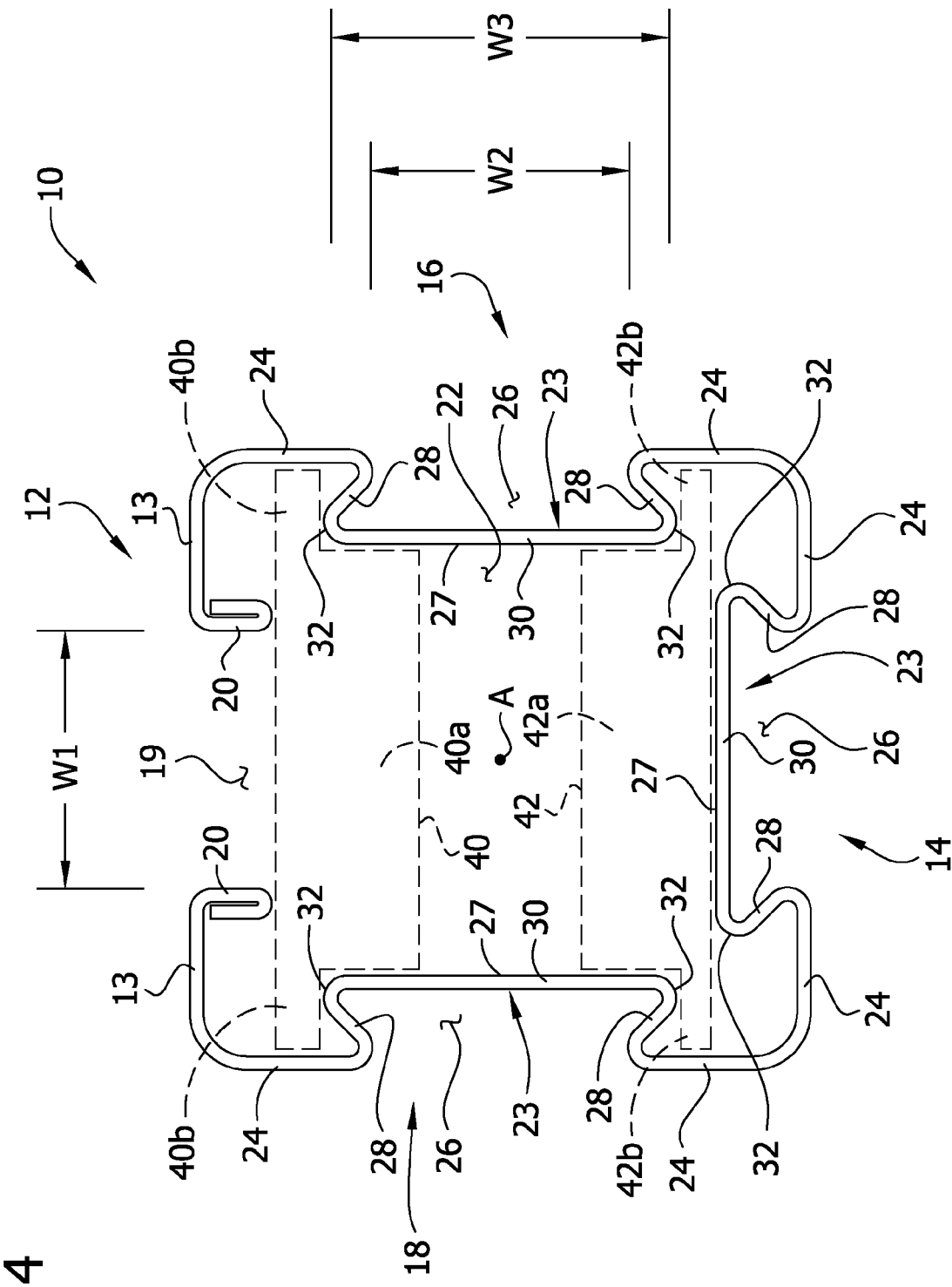
FIG. 4 is a front elevation of the strut, with upper and lower T-shaped tracks defined by an interior of the channel framing being shown in broken lines.
Figure 5:
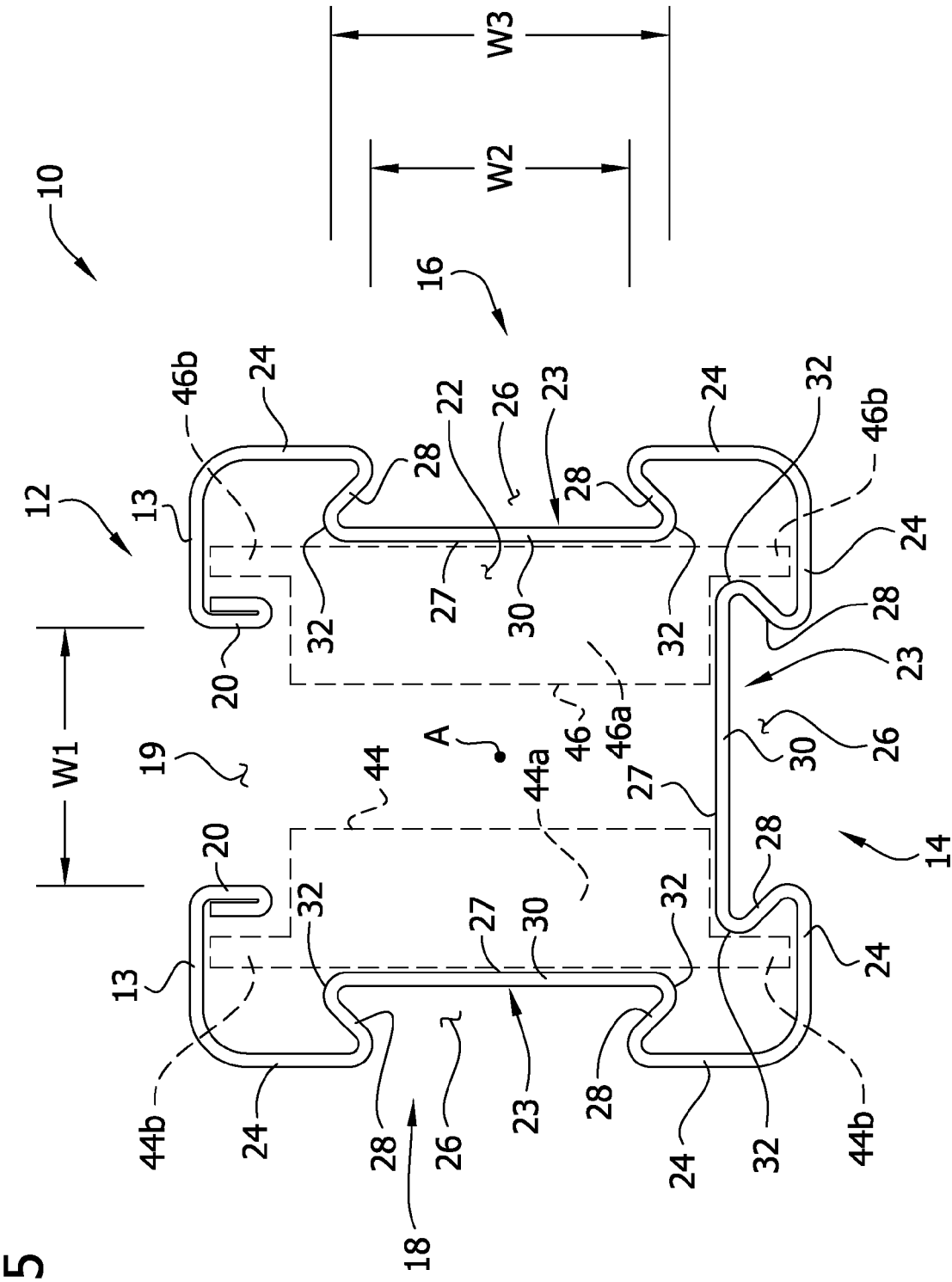
FIG. 5 is similar to FIG. 4, except with left and right T-shaped tracks defined by an interior of the channel framing being shown in broken lines.

One embodiment of the strut 10 is shown in FIGS. 3-5. The strut 10 is elongate with a generally square or rectangular cross-sectional shape having four sides and a longitudinal axis A extending along its length and through opposite open longitudinal ends 10a of the strut 10. As illustrated, the strut has an upper side 12, a lower side 14, a right side 16, and a left side 18 (each indicated generally). As used throughout the present disclosure with respect to the strut 10, the terms defining relative locations and positions of structures and components of the strut, including but not limited to the terms "upper," "lower," "right," "left," "top," and "bottom," are meant to provide a point of reference for such components and structures when the strut is orientated as shown in FIGS. 3-5. (Accordingly, in FIGS. 1 and 2, for example, the strut is oriented "up-side down," relative to its orientation in FIGS. 3-5, such that the upper side 12 of the strut 10 is facing downward, and the lower side of the strut is facing upward. As explained below, the strut 10 may be oriented "right-side up" in other configurations.) Moreover, the terms "inner" and "outer" are relative locations with respect to the longitudinal axis A of the strut 10. The upper side 12 (or slot side) of the strut 10 defines a continuous opening or slot 19 (i.e., the upper side is open) having a width W1 (FIG. 2). The upper side 12 has outer portions 13 on either side of the slot 19, and inturned (or downwardly extending, as illustrated) lips 20 defining the slot and leading to an open interior 22 of the strut 10. The open longitudinal ends 10a also lead to the open interior 22 of the strut 10.

As illustrated, each of the lower, right and left sides 14, 16, 18, respectively, of the strut 10 has an inward portion, generally indicated at 23, and opposite outer portions 24 on either side of the inward portion, extending lengthwise of the strut 10. An exterior surface of the inward portion 23 defines an external fitting groove 26, and an interior surface of the inward portion defines an internal rail 23. Thus, the illustrated strut 10 includes respective left, right, and lower external fitting grooves 26 and corresponding left, right, and lower internal rails 23. Each inward portion 23 includes opposing side walls 28 extending generally inwardly from the respective ones of the outer portions 24 of the corresponding side 14, 16, 18. The side walls 28 extend to a planar inner wall 30 that spans between and interconnects the side walls. The side walls 28 flare away from one another as they extend inward from the outer portions 24 toward the inner wall 30 so that each inward portion 23 has a generally dovetail cross-sectional shape or longitudinal end profile. It is understood that the inner portion 23, including one or both of the fitting groove 26 and the internal rail 23, may be of other shapes and configurations without departing from the scope of the present disclosure.

Referring to FIG. 3, the fitting grooves 26 may be substantially identical to one another, as illustrated. Each fitting groove 26 has a generally dovetail-shaped profile with a first relatively narrower width W2 (e.g., a minimum width) adjacent its entrance and a second relatively wider width W3 (e.g., a maximum width) adjacent the inner wall 30. In the illustrated embodiment, the fitting grooves 26 may be used for securing a component fitting, such as a pipe clamp 31 (FIGS. 10 and 16), to the strut 10. The component fitting 31, in turn, secures a component C (e.g., a pipe, electrical cable, cable tray, or the like) to the strut 10. The component fitting 31 may include a coupling component that is complementary to the fitting grooves 26 (e.g., a dovetail-shaped coupling component that can be inserted into the dovetail-shaped fitting groove) to secure the fitting to the strut 10. Suitable component fittings for the fitting groove 26 are disclosed in U.S. patent application Ser. No. 13/966,897, filed Aug. 14, 2013, the entirety of which is hereby incorporated by reference. Suitable component fittings for the slot 19 are generally known in the art.

Each internal rail 23 has a generally dovetail-shaped profile with opposite internal shoulders 32 at the junctions of the inner wall 30 and the side walls 28. Accordingly, the left and right rails 27 have upper and lower internal shoulders 32, as shown in FIGS. 4 and 5, and the lower rail 27 has left and right internal shoulders 32, as illustrated. The interior surface of the strut 10, including the rails 27, defines at least one track in which the trapeze hanger fitting 11 can be inserted for connecting the trapeze hanger fitting to the strut, as explained in more detail below. Referring to FIGS. 3 and 4, in the illustrated embodiment the interior 22 of the strut 10 has four (4) separate tracks, each of which has an effective T-shape in cross section (i.e., a "T-shaped track"). It is understood that the tracks may have other cross-sectional shapes. FIG. 2 includes a general outline (shown in broken line) of both a first T-shaped track 40 (e.g., an upper T-shaped track), defined by the inturned lips 20, and the upper shoulders 32 and inner faces (defined by the inner walls 30) of the respective left and right internal rails; and a second T-shaped track 42 (e.g., a lower T-shaped track), defined by the lower shoulders 32 and inner faces (defined by the inner walls 30) of the respective left and right internal rails 23, and the inner face (defined by the inner wall 30) of the lower internal rail. FIG. 3 includes a general outline (shown in broken line) of both a third T-shaped track 44 (e.g., a left T-shaped track), defined by the left inturned lip 20, the inner face (defined by the inner wall 30) of the left internal rail 23, and the left shoulder and inner face (defined by the inner wall 30) of the lower internal rail; and a fourth T-shaped track 46 (e.g., a right T-shaped track) defined by the right inturned lip 20, the inner face (defined by the inner wall 30) of the right internal rail 23, and the right shoulder and inner face (defined by the inner wall 30) of the lower internal rail. Each of the illustrated T-shaped tracks 40, 42, 44, 46 have a stem portion 40a, 42a, 44a, 46, respectively, and a crosswise portion(s) or wings 40b, 42b, 44b, 46b, respectively, extending generally transverse (e.g., perpendicular) to the corresponding stem portion.

In the strut 10 illustrated in FIGS. 3-5, openings 50 extend through each of the inner walls 30 of the inward portions 23 of the left, right, and lower sides 18, 16, 14, respectively. In other embodiments, the openings 50 may be in the lower side 14 and, only optionally, in the left and right sides 18, 16, respectively. For example, the strut 10 illustrated in FIGS. 1 and 2 has openings 50 in only the lower side 14 (i.e., the left and right sides 18, 16 are free from the openings. The openings 50 may be, for example, knockouts, or punched, or half-slots, or slots, as are generally known in the art. Typically, the openings 50 in the strut 10 will be the same type of opening, although the same strut may include a mix of different types of openings, such as shown in the illustrated embodiments. It is also understood that the sides may not include openings without departing from the scope of the present invention.

Figure 6:
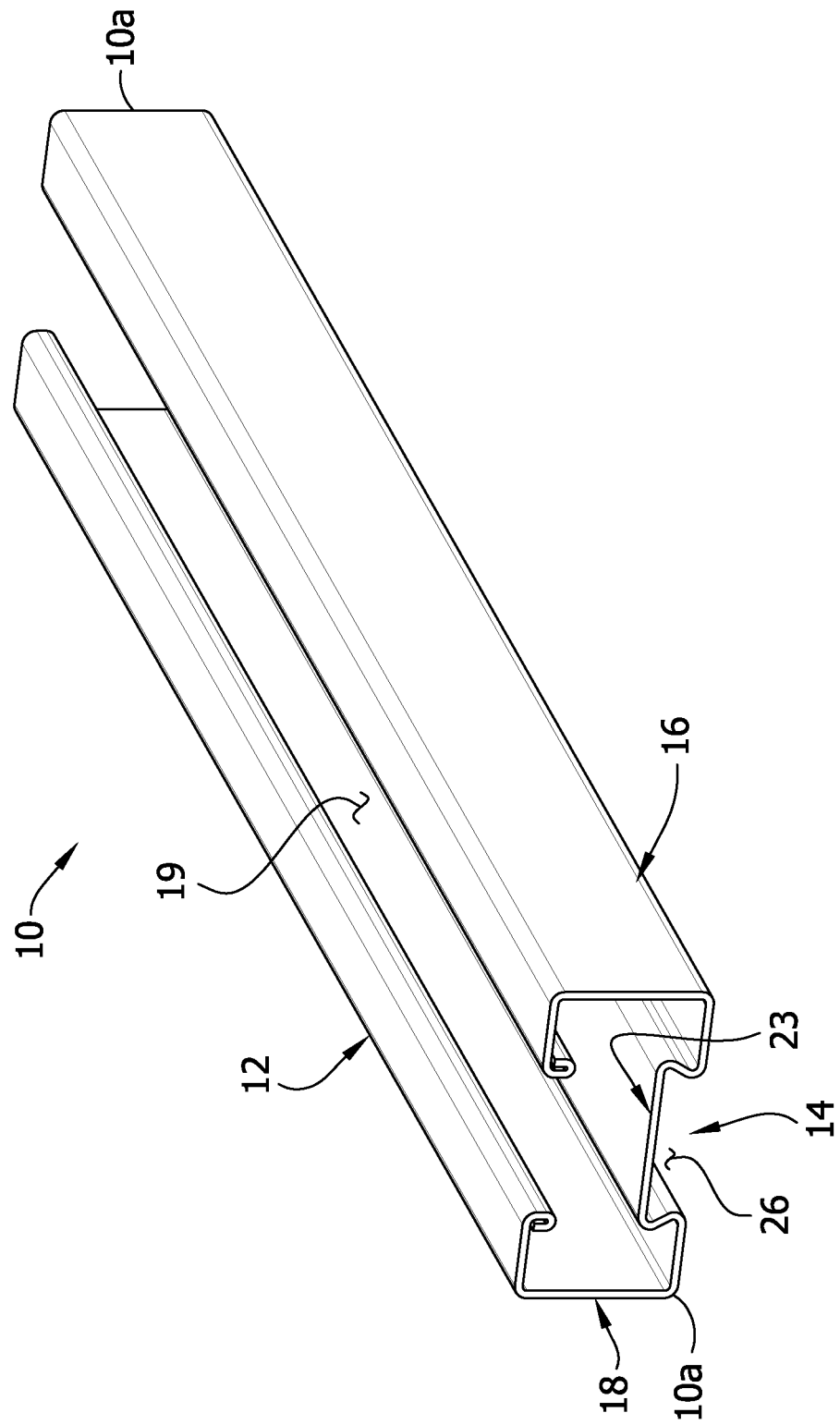
FIG. 6 is a perspective of another embodiment of strut for use in the trapeze hanger system.

Yet another embodiment of a strut suitable for use with the trapeze hanger system 6, and in particular the fitting 11, is indicated generally by the same reference numeral 10 in FIG. 6. Structures of the present strut 10 that are the same or similar to the structures of the strut embodiment illustrated in FIGS. 3-5 are indicated by corresponding reference numerals. This strut 10 is similar to the strut in FIGS. 3-5, except that the left and right sides 18, 16 have widths extending between the upper and lower sides 12, 14 that are less than the widths of the left and right sides of the embodiment shown in FIGS. 3-5. Moreover, the left and right sides 18, 16 of the present embodiment do not include the inward portions (or the grooves and internal rails), but instead, the left and right sides are generally planar.

In one example, the strut 10 may be formed from a sheet of rigid metal, such as low carbon steel, stainless steel, aluminum, or other metals, or from other material, such as fiberglass or plastic. The strut 10 may be cold formed using a rolling mill, such as when forming the strut from steel, or the strut may be extruded from an extrusion die, such as when forming the strut from aluminum. The strut 10 may be formed in other ways. The strut 10 may be formed from a metal sheet having uniform thickness from about 0.5 mm to about 4 mm. In one non-limiting example, the strut 10 may be formed from 18 gauge (1.2 mm) steel sheet metal, or from 20 gauge (0.9 mm) steel sheet metal. In another non-limiting embodiment, the dimension of each of the width and height of the strut 10 may be 53.5 mm, as opposed to 50 mm.

Figure 7:
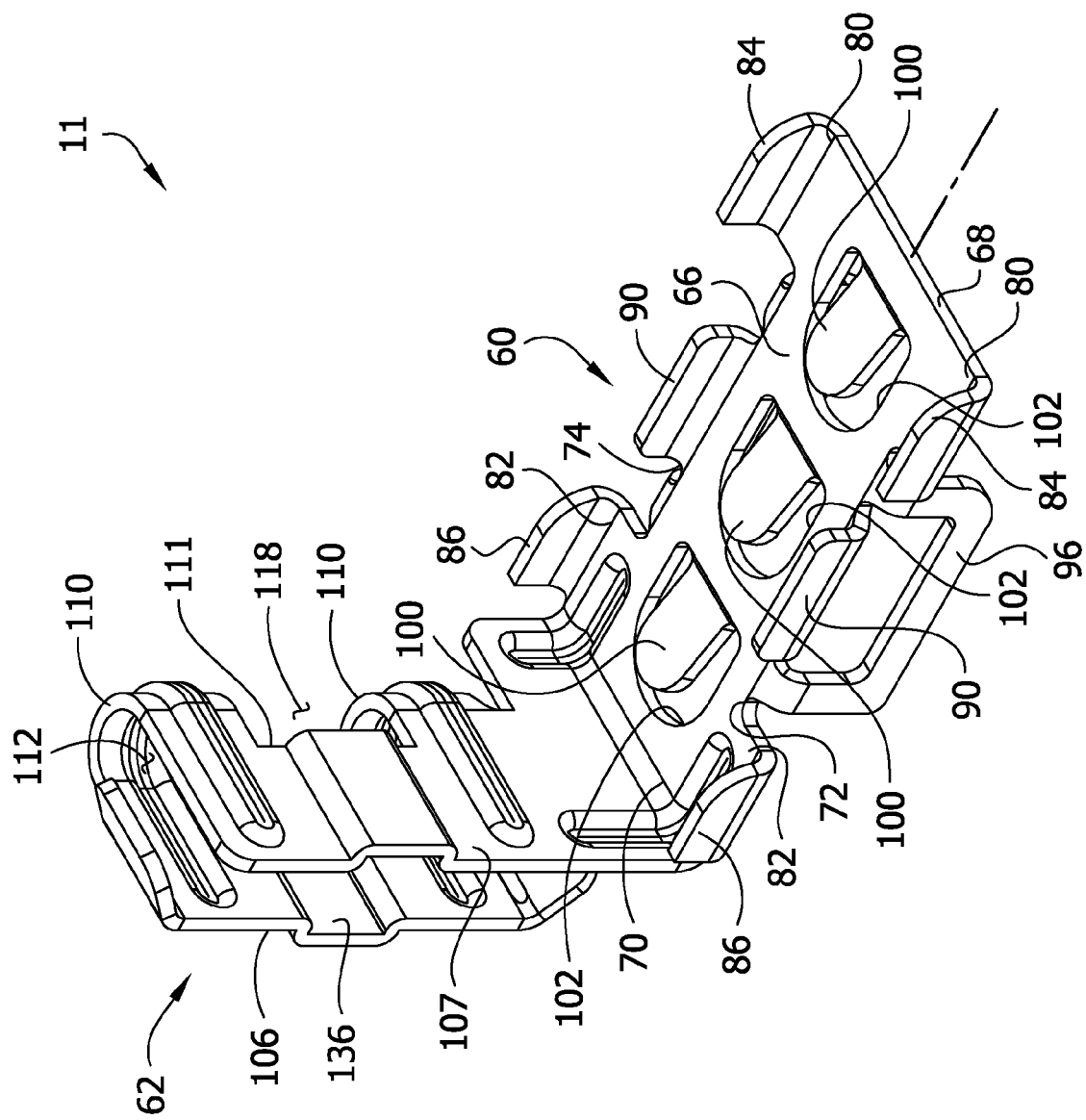
FIG. 7 is a perspective of one embodiment of a trapeze hanger fitting for use in the trapeze hanger system.
Figure 10:
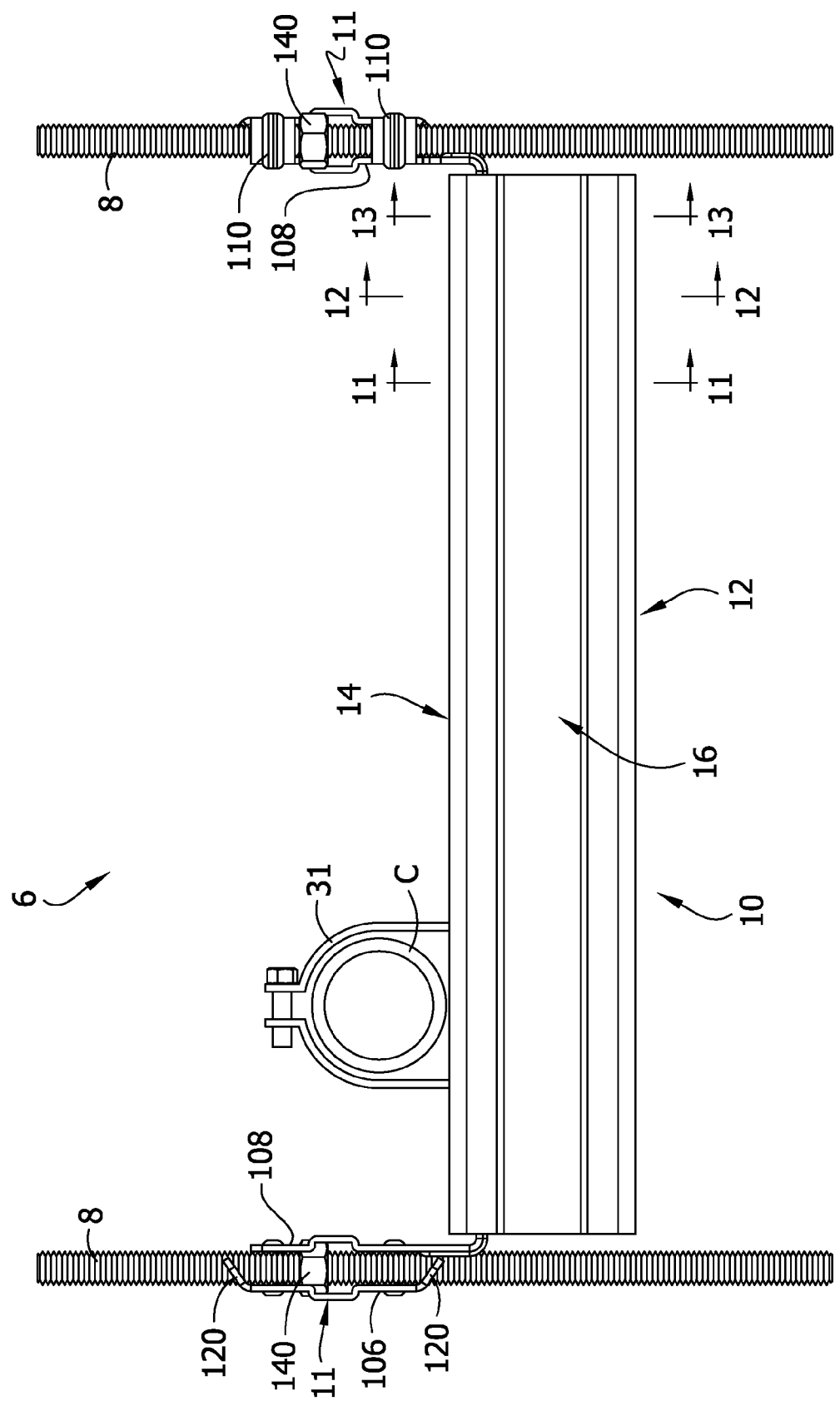
FIG. 10 is an elevation of the assembled trapeze hanger system of FIG. 1.

Referring to FIGS. 2, 7 and 10, the trapeze hanger fitting 11 comprises a strut connecting portion, generally indicated at 60, configured for insertion into the open interior 22 of the strut 10 through one of the open longitudinal ends 10a of the strut to connect the trapeze hanger fitting to the strut. More specifically, in the illustrated embodiment the strut connecting portion 60 is configured for insertion (e.g., sliding insertion) into one or more (e.g., any) of the internal T-shaped tracks 40, 42, 44, 46 defined by the strut 10 for connecting the trapeze hanger fitting to the strut. In the drawings, the strut connecting portion 60 is shown connected to either the upper T-shaped track 40 or the lower T-shaped track 42, as it is contemplated that these are the two primary tracks that will be used with the trapeze hanger fitting 11. It is understood that left and right T-shaped tracks 44, 46 may also be used with the trapeze hanger fitting 11 in other non-illustrated embodiments.

Referring still to FIGS. 2, 7 and 10, the trapeze hanger fitting 11 further comprises a rod securement portion, generally indicated at 62, is connected to the strut connecting portion 60 and configured for securement to one of the threaded rods 8 to secure the trapeze hanger fitting 11 to the rod. With reference to FIGS. 1 and 10, the rod securement portion 62 is configured to be disposed outside the open interior 22 of the strut 10 and longitudinally (or axially) outward from the corresponding open longitudinal end 10a of the strut when the strut connecting portion 60 is inserted into the open interior of the strut. In this way, the threaded rod 8, when secured to the rod securement portion 62, does not pass through the channel 19 into the open interior 22. Instead, the threaded rod 8 is disposed longitudinally (or axial) outward from the corresponding longitudinal end 10a of the strut 10.

Details of the strut connecting portion 60 and the rod securement portion 62 of the illustrated embodiment are described below with the understanding that one or both of the strut connecting portion and the rod securement portion may be of other configurations for performing one or more of the disclosed functions without departing from the scope of the present invention. Moreover, as used throughout the present disclosure with respect to the trapeze hanger fitting 11, the terms defining relative locations and positions of structures and components of the fitting, including but not limited to the terms "upper," "lower," "right," "left," "top," and "bottom," are meant to provide a point of reference for such components and structures when the fitting is orientated as shown in FIGS. 1, 2, 7 and 10, for example.

Figure 8:
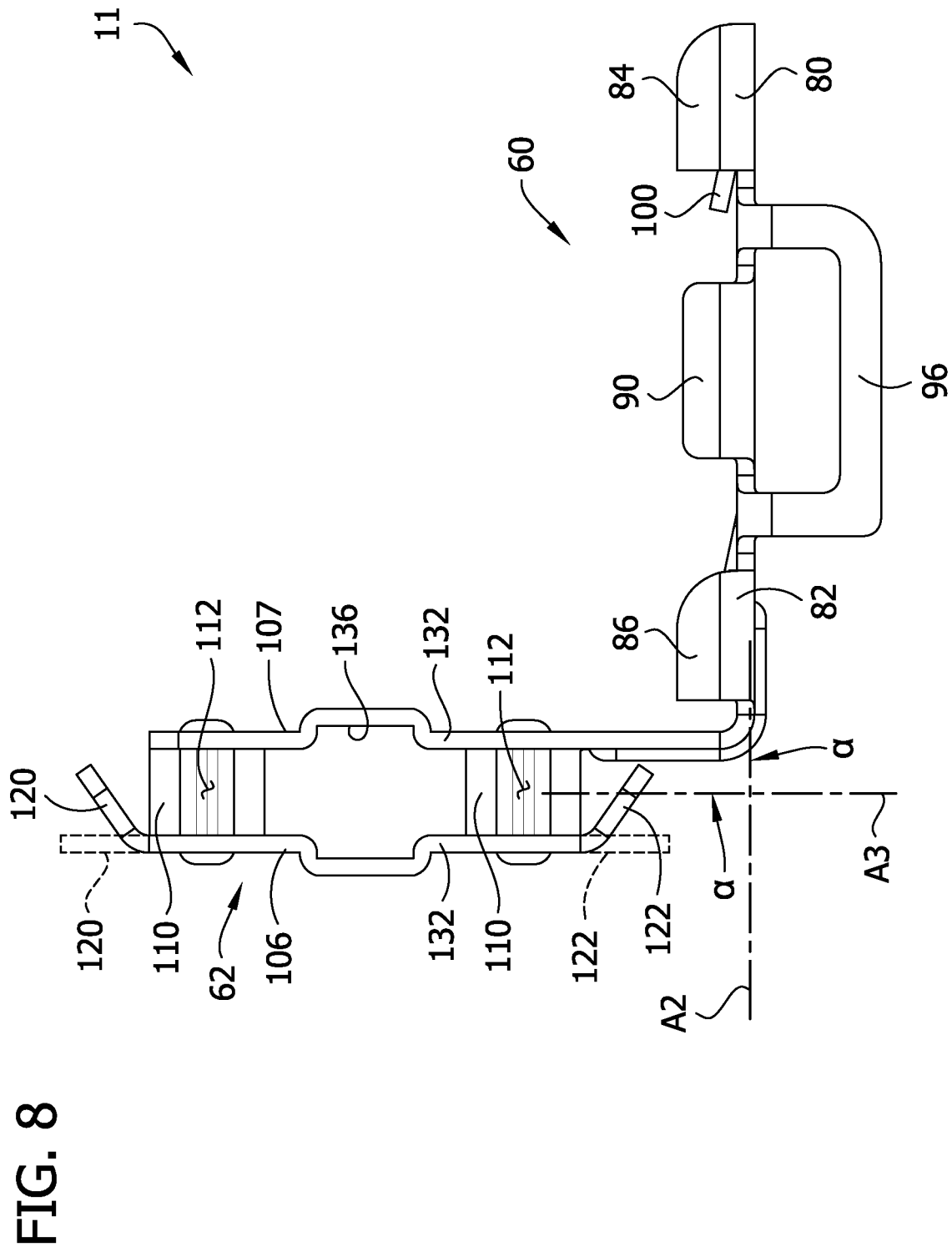
FIG. 8 is a left elevation of the trapeze hanger fitting.
Figure 9:
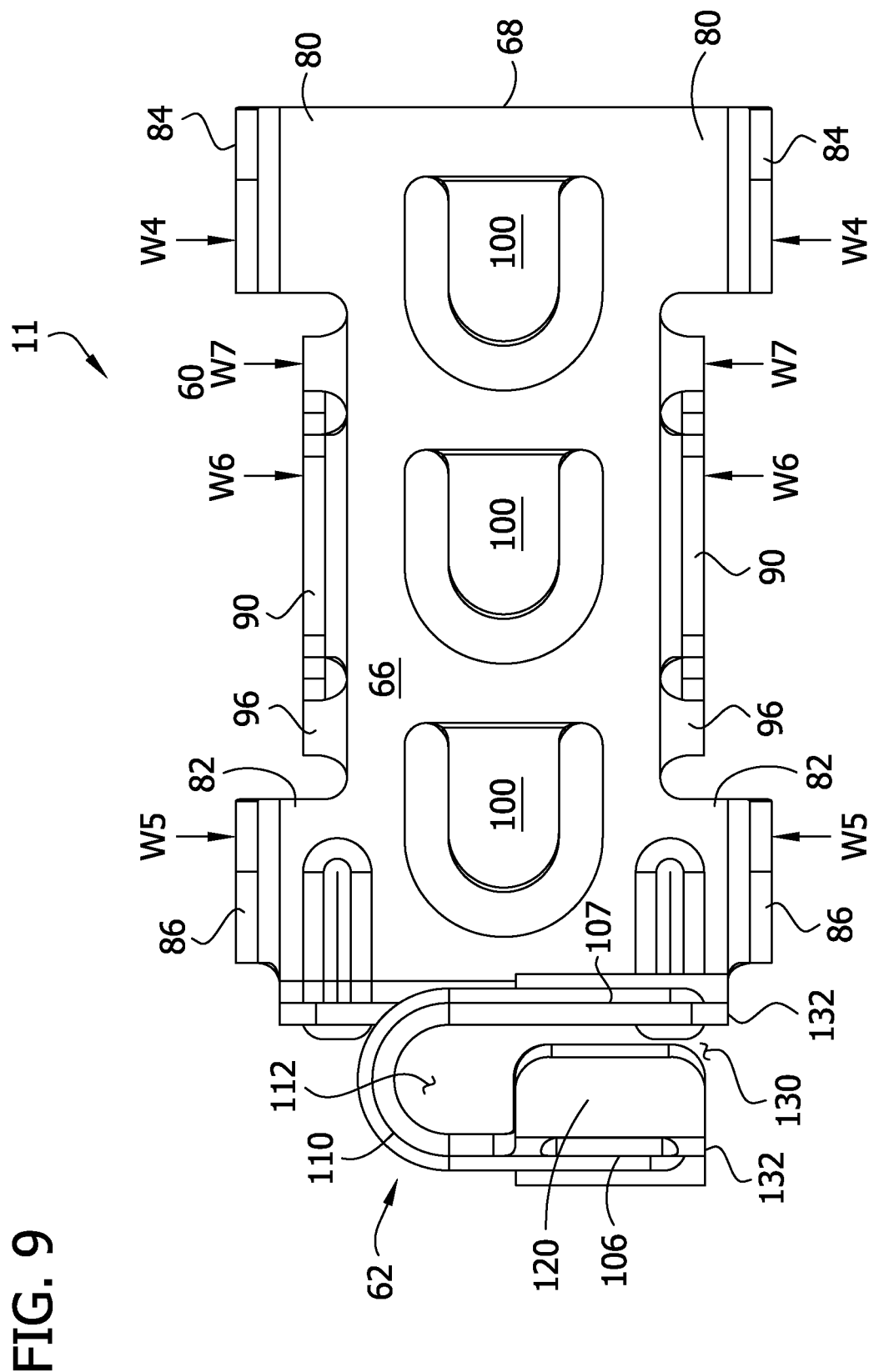
FIG. 9 is a top plan of the trapeze hanger fitting.

Referring to FIGS. 7-9, the strut connecting portion 60 of the trapeze hanger fitting 11 includes a generally planar connecting body 66 having opposite first and second ends 68, 70, opposite side edge margins 72, 74 extending between the first and second ends, and an imaginary axis A2 extending through the first and second ends. A pair of first tongues or wings (each indicated by reference numeral 80) extends laterally outward at either side edge margin 72, 74 adjacent the first end 68 (e.g., free end) of the connecting body 66. A pair of second tongues or wings (each indicated by reference numeral 82) extends laterally outward from either side edge margin 72, 74 adjacent the second end 70 of the connecting body 66. Each of the first and second tongues 80, 82, respectively, have flanges 84, 86, respectively, at a terminal end of the wing. The respective flanges 84, 86 extend in a first direction (e.g., an upward direction in the drawings) generally transverse to the connecting body 66 such that the first tongues 80 and a portion of the connecting body extending therebetween generally define a first channel, and the second tongues 82 and a portion of the connecting body extending therebetween define a second channel.

Figure 11:
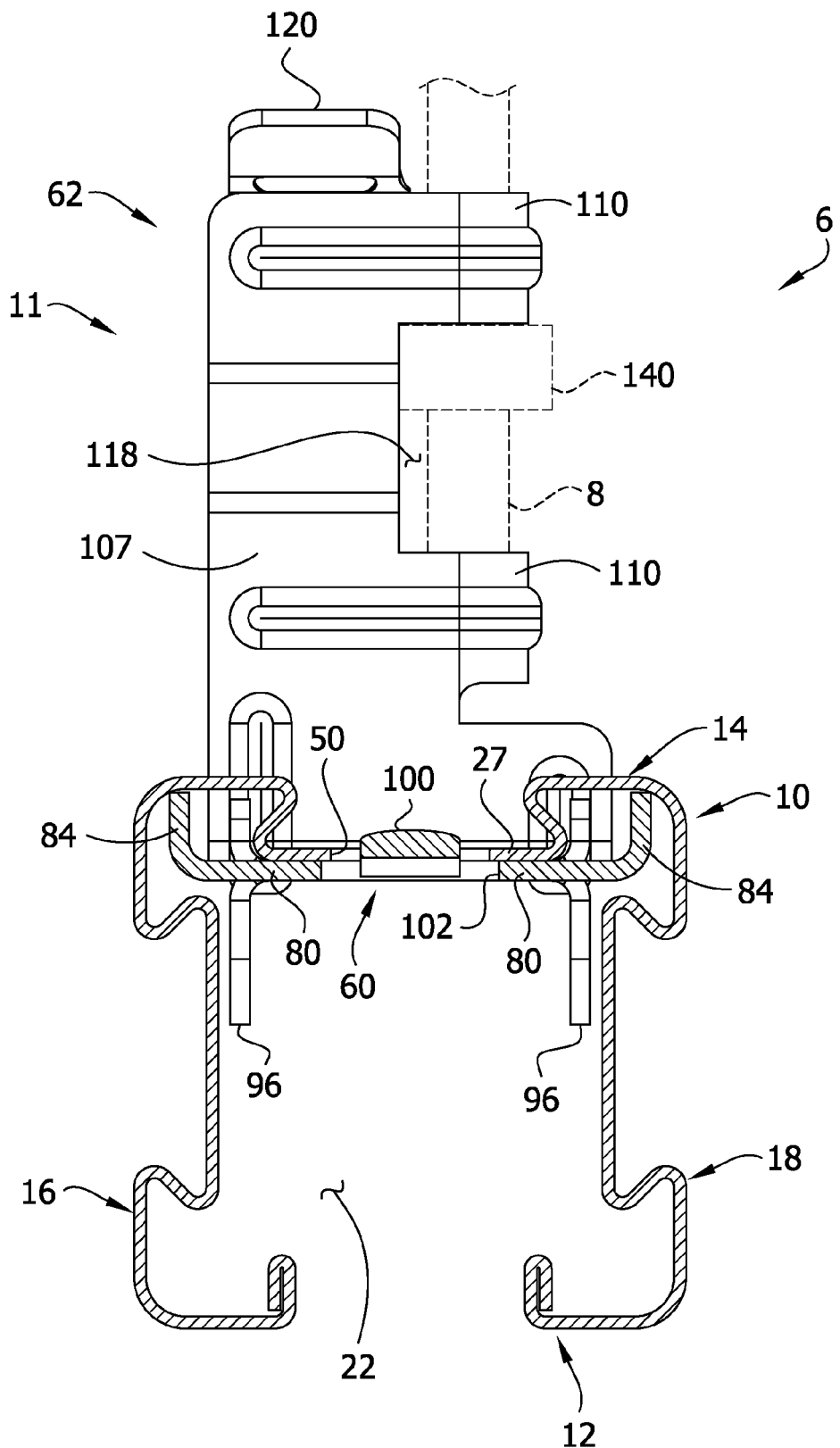
FIG. 11 is a cross section of the assembled trapeze hanger system taken through the plane defined by the line 11-11 in FIG. 10.
Figure 13:
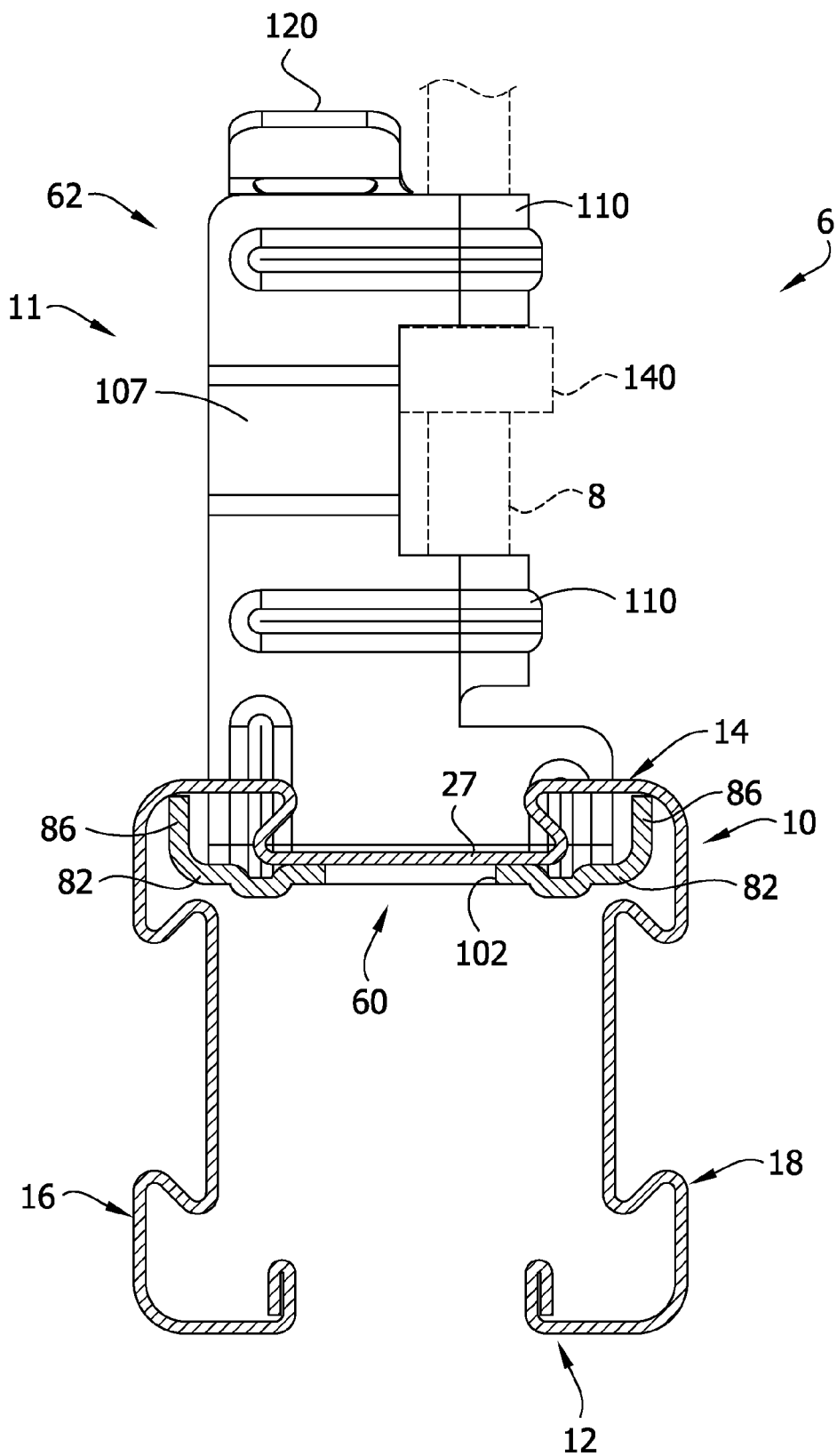
FIG. 13 is a cross section of the assembled trapeze hanger system taken through the plane defined by the line 13-13 in FIG. 10.

The illustrated first and second tongues 80, 82 are configured for sliding reception in any one of the T-shaped tracks 40, 42, 44, 46 of the strut 10 for connecting the strut connecting portion 60 to the strut. More specifically, the illustrated first and second tongues 80, 82 are configured for sliding reception in the crosswise portion 40b, 42b, 44b, 46b of any one of the T-shaped tracks 40, 42, 44, 46, through either open longitudinal end 10a of the strut 10. For example, with reference to FIGS. 1, 2 and 11, when inserting the strut connecting portion 60 into the lower T-shaped track 42, as illustrated, the first tongues 80 enter the respective crosswise portions 42b of the lower T-shaped track 42 and the flanges 84, which are positioned laterally outward of the shoulders 32 of the lower internal rail 23, move past the respective shoulders 32. In other words, the first channel defined by the first tongues 80 and the portion of the connecting body 66 extending therebetween receive the lower internal rail 23. Accordingly, the first tongues 80 guide the strut connecting portion 60 into the lower T-shaped track 42 (or other selected track) of the strut 10. Moreover, the first tongues 80 overlie that respective shoulders 32 of the left and right internal rails 23 and the flanges 84 may be configured to engage the interior surface of the outer portions 24 of the lower side 14. The second tongues 82 and second flanges 86 are substantially similar in structure and function to the first tongues 80 and flanges 84. Accordingly, as shown in FIG. 13, when the strut connecting portion 60 is fully inserted into the lower T-shaped track 42, for example, the second tongues 82 overlie the respective shoulders 32 of the left and right internal rails 23 and the flanges 86 may be configured to engage the interior surface of the outer portions 24 of the lower side 14. In effect, the first and second tongues 80, 82, including the flanges 84, 86, both guide the strut connecting portion 62 into the selected T-shaped track 40, 42, 44, 46 and inhibit movement of the strut connecting portion in the first and second directions (e.g., upward and downward movement) relative to the strut 10 when the strut connecting portion is received in the selected T-shaped track.

Figure 12:
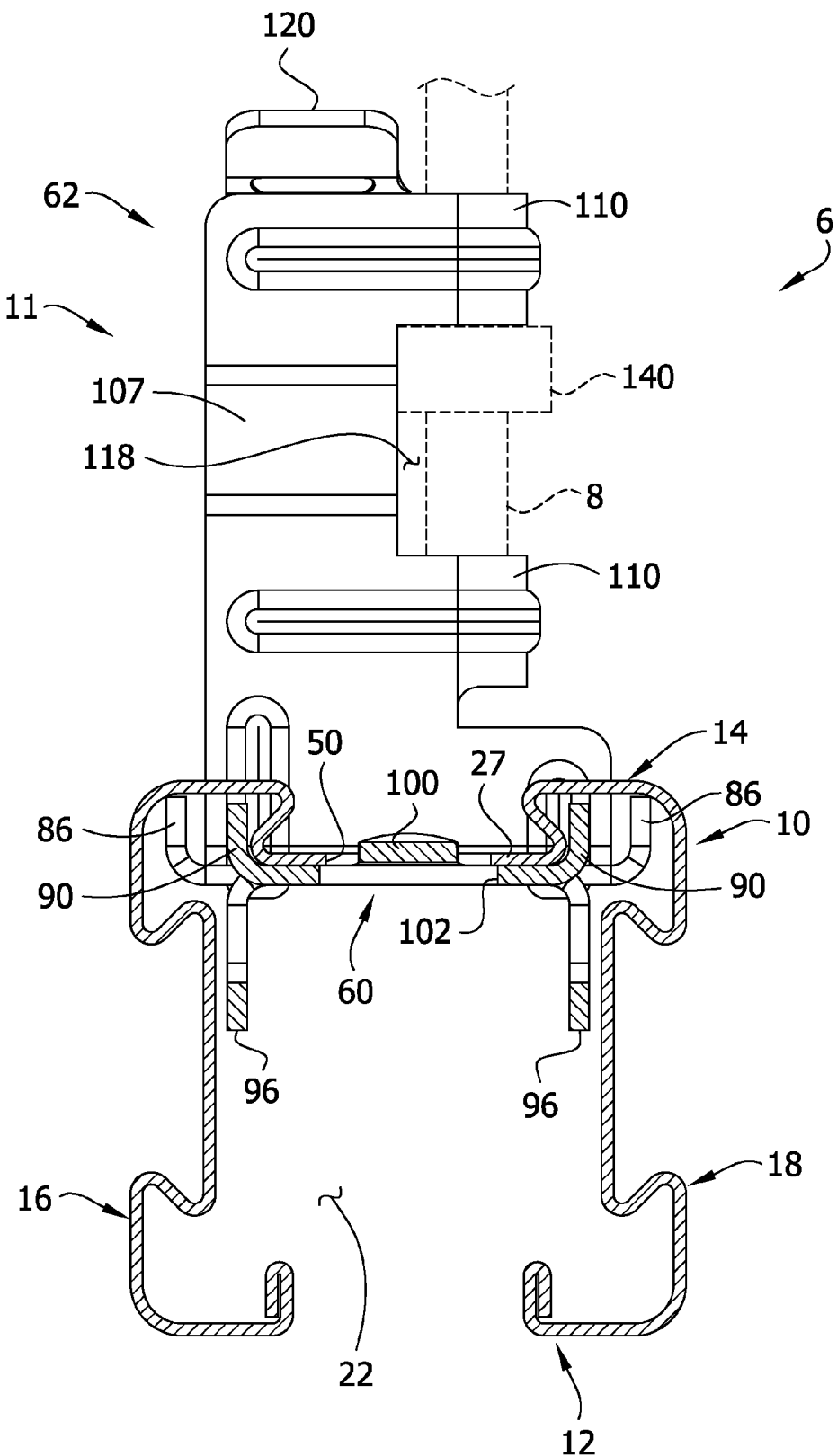
FIG. 12 is a cross section of the assembled trapeze hanger system taken through the plane defined by the line 12-12 in FIG. 10.

Referring to FIGS. 7 and 12, the strut connecting portion 60 further includes a pair of clip jaws (each indicated by reference numeral 90) at either side edge margin 72, 74 and extending in the first direction (e.g., the upward direction; the same direction as the flanges 84, 86 of the tongues 80, 82) generally transverse to the connecting body 66. In the illustrated embodiment, the jaws 90 are disposed axially between the pairs of respective first and second tongues 80, 82. The jaws 90 are resiliently deflectable, relative to the connecting body 66, laterally outward, away from the imaginary axis A2 and are configured to clip onto any one of the internal rails 23 of the strut 10 upon insertion of the strut connecting portion 60 into the selected T-shaped track 40, 42, 44, 46 through the selected open longitudinal end 10a. More specifically, as the strut connecting portion 60 slides axially within the T-shaped track 40, 42, 44, 46, the jaws engage the internal rail 23 (e.g., the shoulders 32 of the rail) and resiliently deflect laterally outward so that the rail is received between the jaws. As shown in FIG. 12, the resilient force of the clip jaws 90 retain the jaws in frictional engagement with at least the shoulders 32 of the internal rail 23, thereby effectively clipping the strut connecting portion 60 onto the internal rail. Accordingly, the jaws 90 and a portion of the connecting body 66 extending therebetween generally define a spring clip fastener for attaching the strut connecting portion 60 to one of the internal rails 23 of the strut 10 as the strut connecting portion 60 is inserted into the selected T-shaped track 40, 42, 44, 46.

With reference to FIGS. 7, 8 and 12, the strut connecting portion 60 also includes a pair of alignment arms (each indicated by reference numeral 96) at either side edge margin 72, 74 of the connecting body 66 and extending in a second direction (e.g., a downward direction; a direction opposite that of the clip jaws 96 and the flanges 84, 86) generally opposite the first direction and generally transverse to the connecting body. In the illustrated embodiment, the alignment arms 96 are disposed axially between the pairs of respective first and second tongues 80, 82 and are generally axially coextensive with the clip jaws 90. The alignment arms 96 are configured for sliding reception in any one of the T-shaped tracks 40, 42, 44, 46 of the strut 10 for properly aligning the axis A2 of the strut connecting portion 60 with the longitudinal axis A of the strut. More specifically, the alignment arms 96 are configured for sliding reception in the stem portion 40a, 42a, 44a, 46a of any of the T-shaped tracks 40, 42, 44, 46. The alignment arms 96 may be resiliently deflectable inward toward the axis A2 of the strut connecting portion 60 relative to the connecting body 66 such that upon insertion of the alignment arms into the stem portion stem portion 40a, 42a, 44a, 46a of any of the T-shaped tracks 40, 42, 44, 46, the alignment arms engage opposing internal rails 23 (e.g., the inner walls 30 of the opposing internal rails) and resiliently deflect inward. The resilient forces of the alignment arms 96 retain the arms in frictional engagement with the inner walls 30 of the opposing internal rails 23. In effect, the alignment arms 96 may inhibit lateral movement of the trapeze hanger fitting 11 relative to the strut 10 and properly position the strut relative to the threaded rods 8 when the strut is secured to the threaded rods. In addition, the alignment arms 96, along with the portion of the connecting body 66 extending therebetween, provide support to the strut 10 by acting as a hold open or spacer between the opposing internal rails 23. This function inhibits the left and right sides 18, 16 of the strut 10 from canting toward one another about the lower side 14 when the trapeze hanger fitting 11 is inserted in either one of the lower and upper T-shaped tracks 42, 40.

As can be seen in FIG. 9, the first and second tongues 80, 82 have respective widths W4, W5, respectively, that are greater than respective widths W6, W7 defined by the clip jaws 90 and the alignment arms 96, respectively. Moreover, the widths W4, W5 of the first and second tongues, 80, 82, respectively, may be substantially equal, although the first and second tongues may have different widths. The widths W6, W7 defined by the clip jaws 90 and the alignment arms 96, respectively, may be substantially equal, or the clip jaws and the alignment arms may have different widths.

Referring to FIGS. 1 and 7, to inhibit the connecting portion 60 from incidentally (i.e., unintentionally) withdrawing from the open longitudinal end 10a of the strut 10, the illustrated strut connecting portion 60 includes at least one stop or catch 100 on the connecting body 66. In the illustrated embodiment, the strut connecting portion 60 includes three catches 100 spaced apart axially on the connecting body 66. The illustrated catches 100 are identical in structure and function, and therefore, reference will be made to one catch for ease of description with the understanding that the following description applies equally to each of the catches. The catch 100 is cantilevered on the connecting body 66 (i.e., it has an attached end and a free end) and disposed within the perimeter of the connecting body defined by the first and second ends 68, 70 and the first and second side edge margins 72, 74. The catch 100 extends, from its attached end to its free end, toward the second end 70 of the connecting body 66 and slightly out of plane relative to the connecting body, such that the free end of the catch is spaced from the plane of the connecting body in the first direction (i.e., the free end of the catch is slightly above an upper surface of the connecting body). The catch 100 is resiliently deflectable toward the connecting body 66, generally about its attached end (e.g., the junction of the attached end and the connecting body forms a living hinge), and clearance opening 102 (or recess) in the connecting body 66 allows the free end of the catch to deflect to a position in which it is at (e.g., coplanar with) or effectively below the upper surface of the connecting body.

As the connecting portion 60 is inserted into the selected T-track 40, 42, 44, 46, such as the lower T-track as shown in FIG. 1, the catch 100 engages the corresponding internal rail 27 (e.g., the inner surface 30 of the internal rail) and resiliently deflects toward the connecting body. As the free end of the catch 100 moves past a peripheral edge of one of the openings 50, the catch pivots about its attached end away from the connecting body (i.e., rebounds to its initial position) and enters the opening. When the catch is received in one of the openings 50 and is in its initial position, the free end of the catch 100 will catch or engage the peripheral edge of the corresponding opening if a withdrawal force is applied to the strut connecting portion 60, thereby inhibiting unintentional disconnection of the trapeze hanger fitting 11 and the strut 10. In the illustrated embodiment, there are three catches 100 spaced apart axially on the connecting body 66 to ensure that at least one of the catches is or will be received in one of the openings 50 if a withdrawal force is applied to the strut connecting portion 60. To disconnect the trapeze hanger fitting 11 from the strut 10 when the catch 100 received in one of the openings 50, the catch 100 can be resiliently deflected by pressing down on the free end of the catch and simultaneously applying a withdrawal force to the fitting, thereby sliding the connecting portion 60 out of the corresponding selected T-shaped track 40, 42, 44, 46.

Referring to FIGS. 7 and 8, the rod securement portion 62 of the trapeze hanger fitting 11 is connected to the second end 70 of the connecting portion 60 and extends outward from the strut connecting portion in the first direction (e.g., upward direction) generally transverse to the axis A2 of the strut connecting portion. It is understood that the rod securement portion 62 may extend in the second direction (e.g., downward direction) relative to the axis A2 of the strut connecting portion. The rod securement portion 62 comprises a pair of spaced apart, opposing plates 106, 107 and a set of one or more hooks (each indicated by reference numeral 110) extending between and interconnecting first side edge margins 111 of the respective opposing plates. In the illustrated embodiment, the hook set comprises two hooks 111 having inner arcuate rod support surfaces defining an elongate recess 112. As shown in FIG. 8, the hook-defined recess 112 has an axis A3 extending along the rod securement portion 62 and intersecting the axis A2 of the strut connecting portion 60 at an offset angle α. For example, the angle α may be about 90 degree, plus or minus 5 degrees, or another angle. The hooks 110 are space apart vertically (i.e., along the axis A3) and define a gap 118 therebetween (See also FIGS. 11-13).

The rod securement portion 62 also includes first and second field-bendable tabs 120, 122 projecting from one or both of the opposing plates 106. In its factory (un-deformed) state or condition, the first tab 120 projects from a first end (e.g., an upper end) of the plate 106, generally in the plane of the plate 106, and the second tab 122 projects from a second end (e.g., a lower end) of the plate 106, generally in the plane of the plate 106. (The tabs 120, 122 in their un-deformed state or condition are shown in broken lines in FIG. 8.) The tabs 120, 122 are bendable about bending axes at the respective junctions of the tabs and the plate 108 toward the axis A3 of the elongate recess 112. To facilitate bending, one or more openings (e.g., slots 128, FIG. 1) may be provided along the bend lines.

Figure 14:
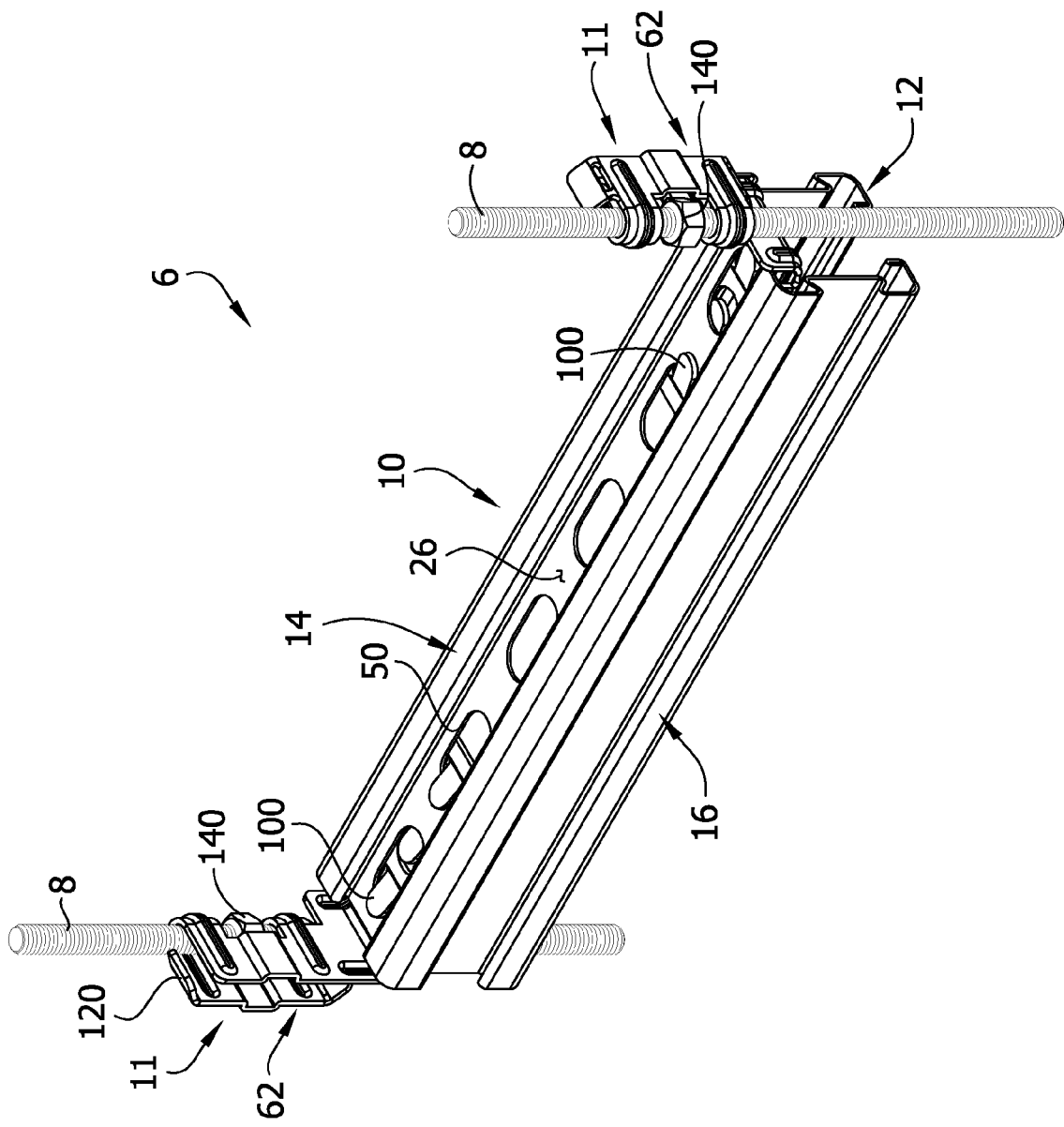
FIG. 14 is similar to FIG. 1, except nuts on threaded rods of the trapeze hanger system are in an unlocked position.

As generally shown in FIG. 2, to secure the rod securement portion 62 of the trapeze hanger fitting 10 the threaded rod 8, the threaded rod is received between the opposite first and second plates 106, 107 through a slot-shaped opening 130 defined between second edge margins 132 of the first and second plates (see FIGS. 8 and 9). Widened portions of the first and second plates 106, 107 extend laterally outward to define an enlarged space 136 therebetween to provide clearance for a nut 140 threaded on the rod 8. The rod 8 is further moved into the recess 112 and the nut 140 is received in the gap 118 between the first and second hooks 110, as shown in FIG. 14. The tabs 120, 122 can then be folded inward to capture the rod 8 therein. The trapeze hanger fitting 11 is then moved downward on the rod 8 from the position shown in FIG. 14 to the position shown in FIGS. 1 and 10 such that the nut 140 is moved out of alignment with the widened portions of the first and second plates 106, 107, and the hook 110 disposed above the nut 140 engages and is supported by the nut. The nut 140 is inhibited from rotating on the threaded rod 8 in this locked position between the spacing between the opposing plates 106, 107 adjacent the nut does not provide clearance for the nut to rotate.

The illustrated rod securement portion 62 has a feature which facilitates adjustment of elevation of the trapeze hanger fitting 11 (and thus the strut 10) on the rod 8. In the position shown in FIG. 14, the nut 140 can be rotated on the rod 8 to move the nut upward or downward on the rod. The widened portions of the first and second plates 106, 107 defining the enlarged space 136 provide clearance for the nut 140 to rotate on the rod 8. Thus, even after folding the tabs 120, 122, elevation of the strut 10 can be adjusted by first moving the trapeze hanger fitting 11 upward on the rod a small distance to align the nut 140 with the widened portions of the first and second plates, and then rotating the nut to re-position the nut on the rod.

In one example, the trapeze hanger fitting 11 may be formed as a unitary, one-piece construction. For example, the fitting 11 may be formed from a single sheet of rigid metal, such as low carbon steel, stainless steel, aluminum, or other metals, or from other material, such as fiberglass or plastic.

Figure 15:
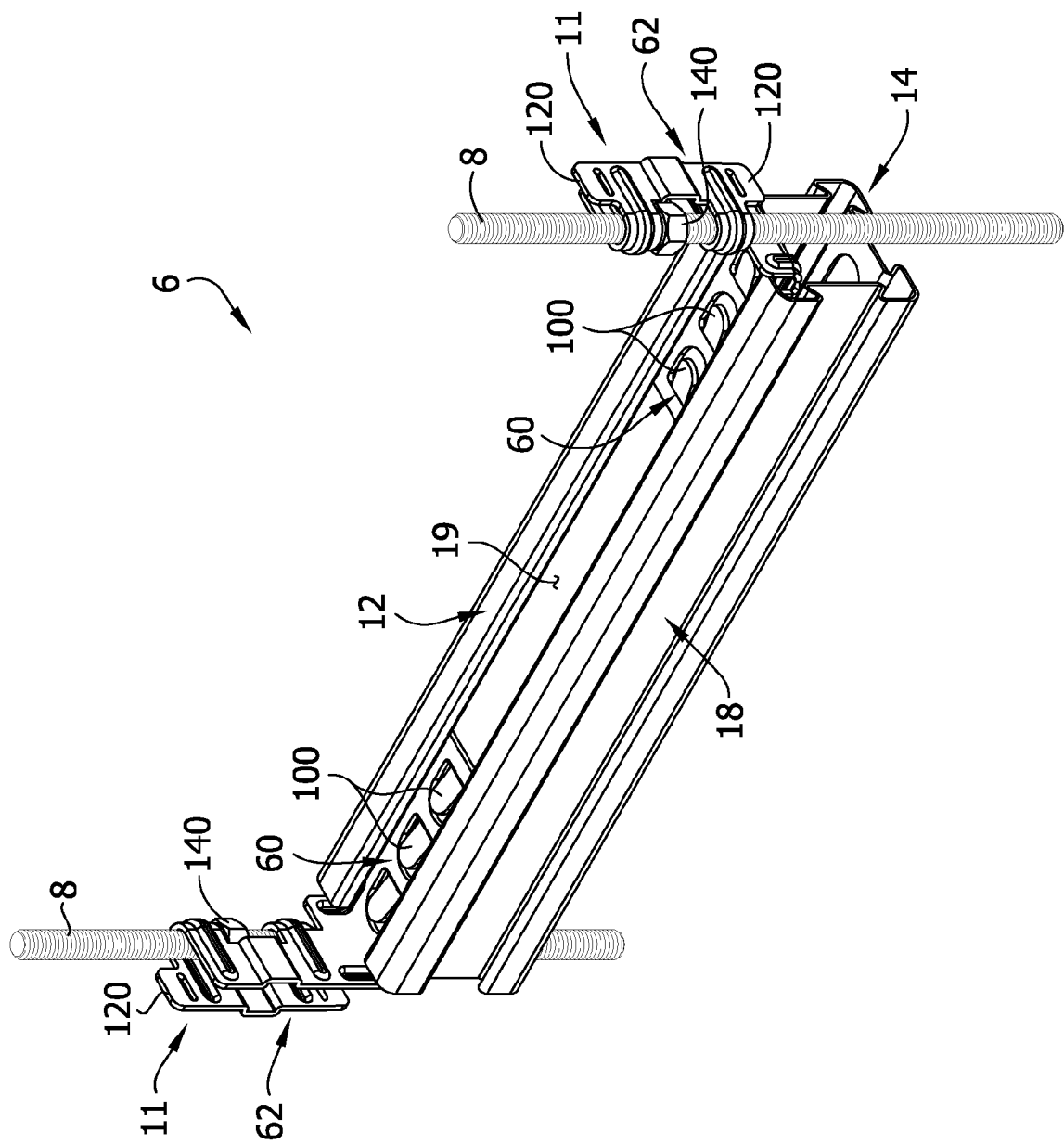
FIG. 15 is similar to FIG. 1, except the trapeze hanger fitting is received in an upper T-shaped track of the strut.
Figure 16:
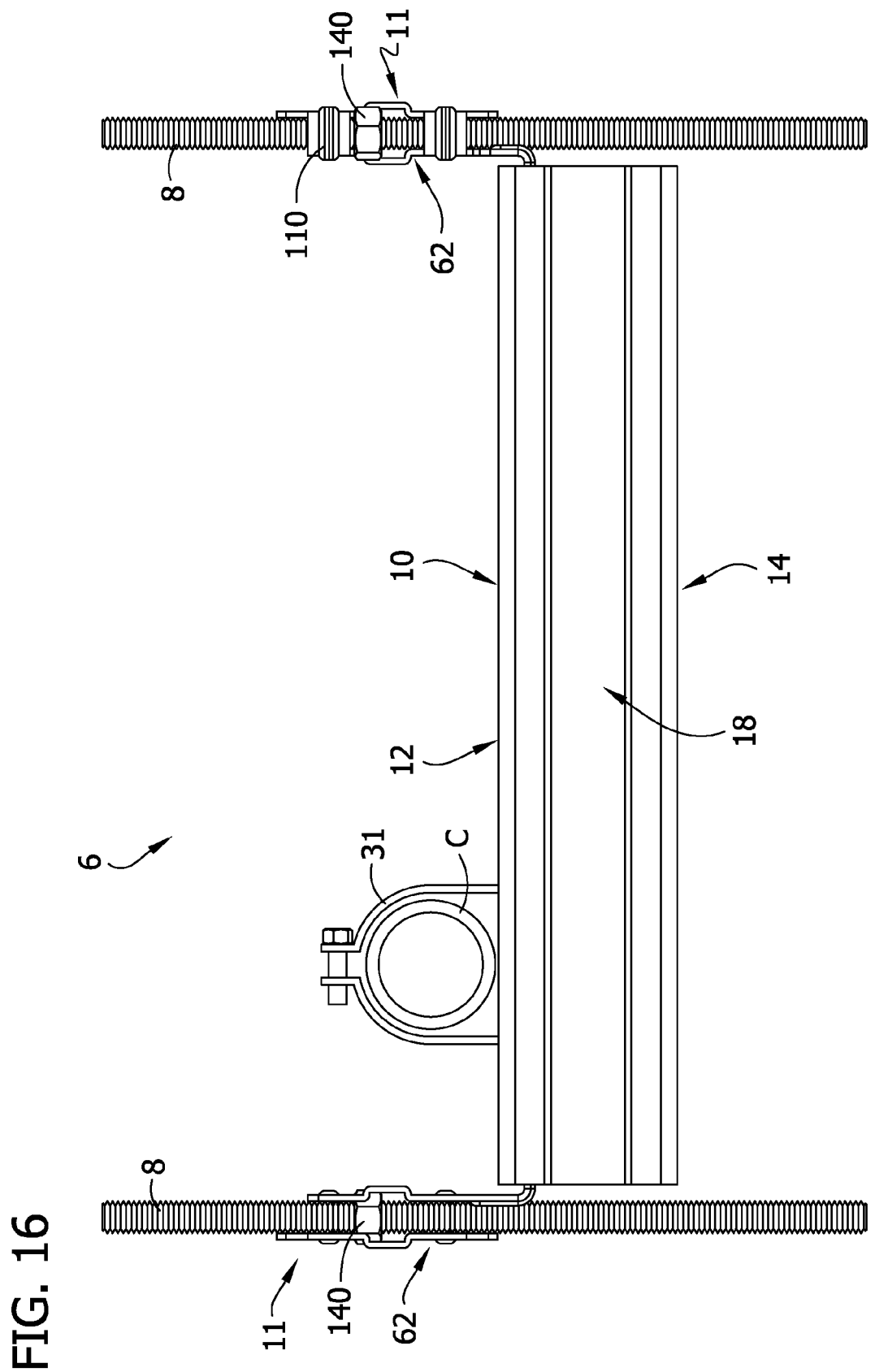
FIG. 16 is an elevation of FIG. 15, including a component secured to the strut.
Figure 17:
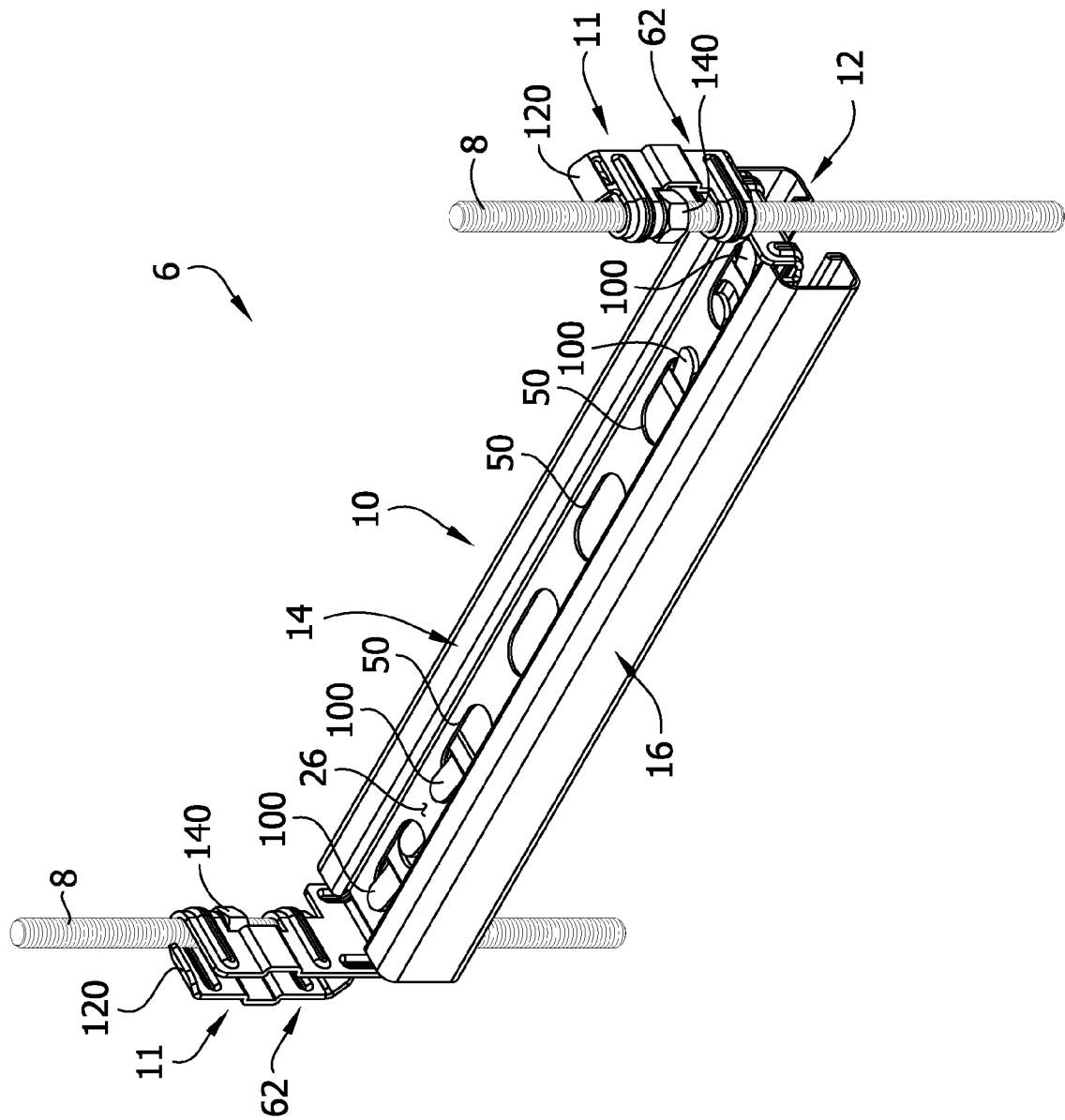
FIG. 17 is similar to FIG. 1, except the strut is a different type of strut.
Figure 18:
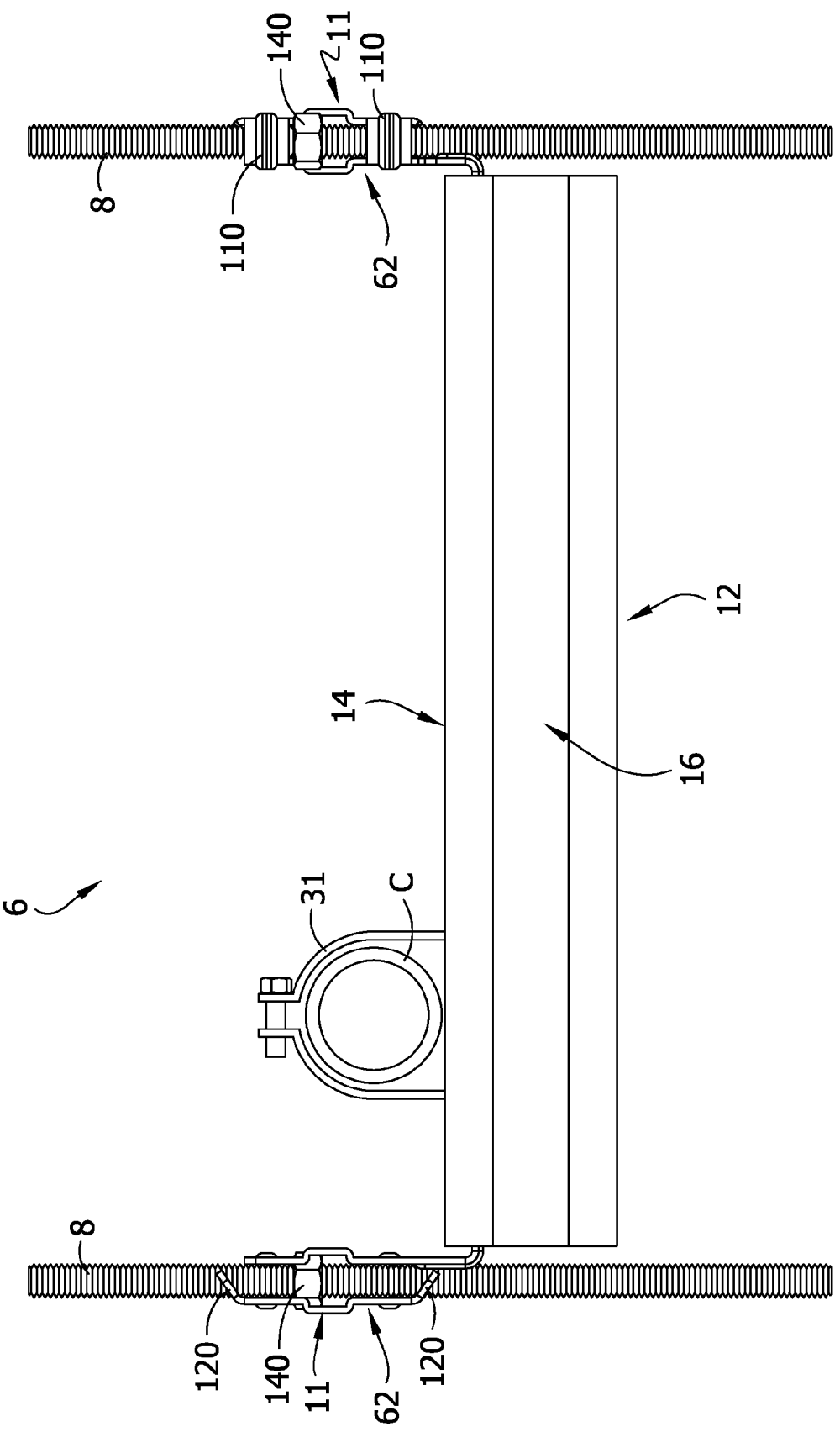
FIG. 18 is an elevation of FIG. 17, including a component secured to the strut.
Figure 19:
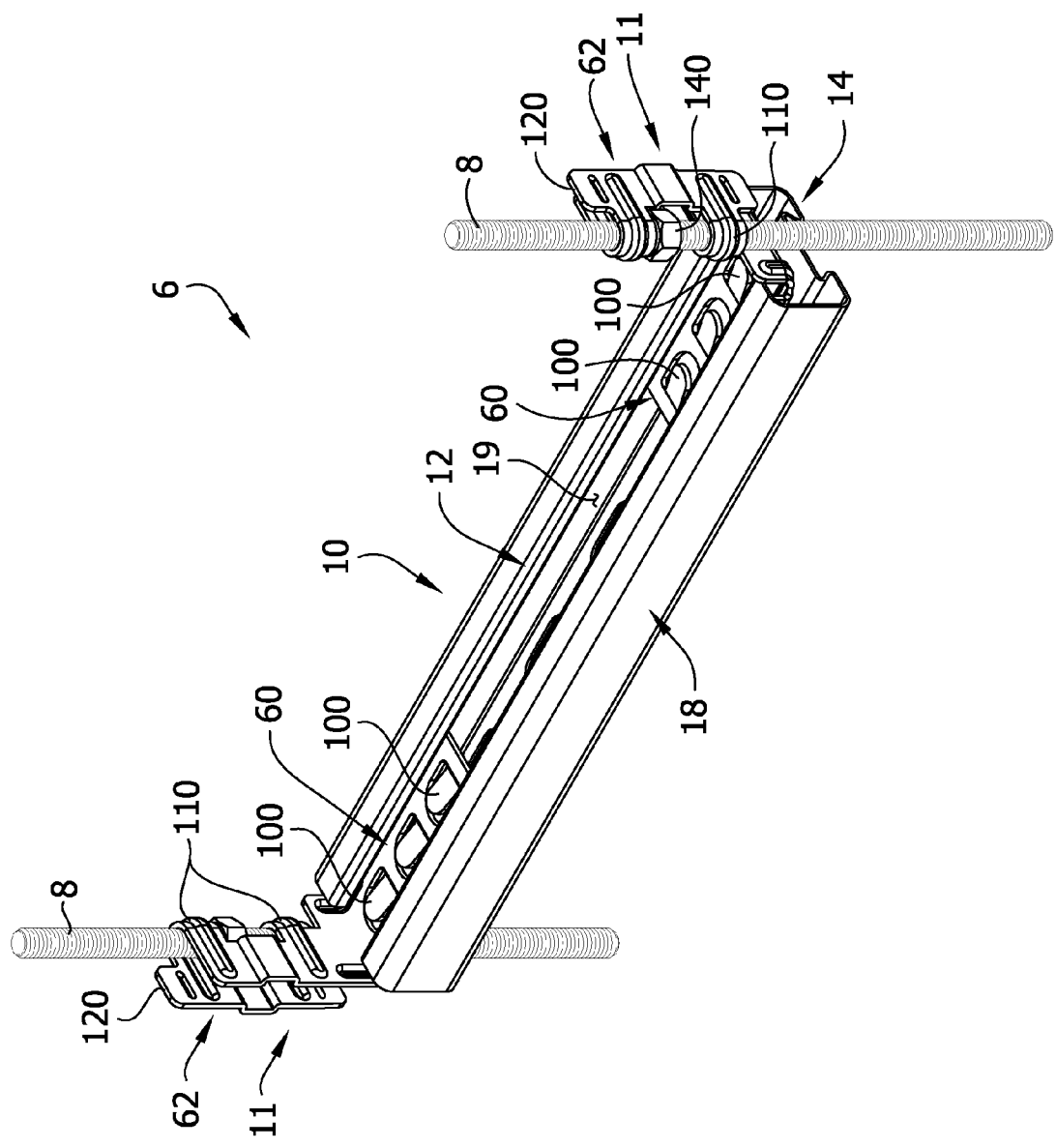
FIG. 19 is similar to FIG. 18, except the trapeze hanger fitting is received in an upper T-shaped track of the strut.

Referring to FIGS. 15-20, the trapeze hanger system 6 is shown attached to different types of struts 10 and/or in different configurations in use. In FIG. 15, the trapeze hanger fitting 11 is inserted in the upper T-shaped track 40 and the trapeze hanger system (as assembled) is oriented such that the upper side 12 of the strut 10 faces upward and the lower side 14 faces downward. As shown in FIG. 16, one or more components C (e.g., pipes, electrical cables, cable trays, and the like) may be secured to the upper side 12 of the strut 10 using a fitting 31 that is secured within the channel 19. In FIG. 17, the trapeze hanger fitting 11 is inserted in the upper T-shaped track 40 of the strut 10 illustrated in FIG. 6 and the trapeze hanger system (as assembled) is oriented such that the upper side 12 of the strut faces downward and the lower side 14 faces upward. As shown in FIG. 18, one or more components C (e.g., pipes, electrical cables, cable trays, and the like) may be secured to the lower side 14 of the strut 10 using a fitting 31 that is secured within the fitting groove 26. In FIG. 19, the trapeze hanger fitting 11 is inserted in the upper T-shaped track 40 and the trapeze hanger system (as assembled) is oriented such that the upper side 12 of the strut 10 faces upward and the lower side 14 faces downward. As shown in FIG. 20, one or more components C (e.g., pipes, electrical cables, cable trays, and the like) may be secured to the upper side 12 of the strut 10 using a fitting 31 that is secured within the channel 19. Other configurations and variations of the how the trapeze hanger system 6 (as assembled) is hung from the elevated structure do not depart form the scope of the present invention. For example, in other orientations the trapeze hanger systems in FIGS. 1 and 15-20 may be inverted (i.e., flipped upside down as illustrated).

One embodiment of a method of assembling and installing the trapeze hanger system 6 will not be described with the understanding that other ways and variations of assembling and installing the system are possible. In particular, the order of the steps may vary, depending on the preference of the assembler/installer. The following description is in reference to assembling and installing the trapeze hanger system 6 illustrated in FIGS. 1 and 2.

In one example, first and second trapeze hanger fittings 11 are connected to the strut 10. Each fitting 11 is connected to the strut 10 by sliding the strut connecting portion 60 into the lower T-shaped track 42 through one of the longitudinal ends 10a of the strut 10. Upon insertion, the first tongues 80 enter the respective cross-wise portions 42b of the lower T-shaped track 42 such that the lower internal rail 23 enters the first channel defined between the first tongues. As the strut connecting portion 60 continues to slide along the T-shaped track 42, the alignment arms 96 enter the stem portion 42b of the track (and optionally engage the left and right internal rails and deflect inward, as disclosed above), and the clip jaws 90 engage the lower internal rail and deflect outward to clip onto the rail. As the strut connecting portion 60 further continues to slide along the T-shaped track 42, the second tongues 82 enter the respective cross-wise portions 42b of the lower T-shaped track 42 such that the lower internal rail 23 enters the second channel defined between the second tongues. With the strut connecting portion 60 fully inserted in the lower T-shaped track 42, at least one of the catches 100 is preferably in its initial configuration and received in one of the openings 50 in the lower internal rail 23. (It is understood that if the strut connecting portion 60 was received in the upper T-shaped track 40, the catches 100 would not provide a function because the slot 19 is continuous along the strut 10.)

With the trapeze hanger fittings 11 connected to the strut 10 at the opposite longitudinal ends 10a, the fittings are secured to the respective rods 8, which are depending from the elevated structure (e.g., a ceiling). It is understood that one or both of the fittings 11 may be secured to the respective rods 8 before or after connecting one or both of the fittings to the strut 10. For each fitting 11, one of the rods 8, which includes the nut 140, is inserted between the opposing plates 106, 107 of the rod securement portion 62 of the fitting so that the rod is generally aligned with the axis A3 defined by the hooks 110. With the rod 8 in the hooks 110, the tabs 120, 122 are folded inward to capture the rod therein. The position of each fitting 11 (and thus the position of the strut 10) on the corresponding rod 8 can be adjusted by aligning the respective nut 140 with the enlarged space 136 and rotating the nut on the rod.

Having described embodiments of the invention in detail, it will be apparent that modifications and variations are possible without departing from the scope of the invention defined in the appended claims.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A trapeze hanger fitting comprising:
    a strut connecting portion configured for insertion into an open interior of a strut through an open longitudinal end of the strut to connect the trapeze hanger fitting to the strut, the strut connecting portion including
        a connecting body having opposite first and second ends defining a body axis therebetween, and opposite side edge margins extending between the opposite ends, the first end of the connecting body configured for insertion through the open longitudinal end of the strut,
        a pair of flanges extending outward from adjacent either side edge margin of the connecting body in a first direction that is generally transverse to the body axis, wherein the pair of flanges are configured to engage an interior surface defining the open interior of the strut when the strut connecting portion is inserted into the open interior of the strut, and
        a pair of clip jaws extending outward from adjacent either side edge margin of the connecting body in the first direction, wherein the pair of clip jaws are configured to clip onto the interior surface defining the open interior of the strut when the strut connecting portion is inserted into the open interior of the strut, wherein each of the clip jaws is disposed more inward than the corresponding one of the flanges with respect to the body axis; and
    a rod securement portion connected to the strut connecting portion and configured for securement to a rod to secure the trapeze hanger fitting to the rod, wherein the rod securement portion is configured to be disposed outside the open interior of the strut and longitudinally outward from the open longitudinal end of the strut when the strut connecting portion is inserted into the open interior of the strut.

2. The trapeze hanger fitting set forth in claim 1, wherein the pair of flanges and the connecting body defines a channel.

3. The trapeze hanger fitting set forth in claim 1, wherein the strut connecting portion includes a pair of tongues extending laterally from either side edge margin of the connecting body and interconnecting the connecting body and the pair of flanges.

4. The trapeze hanger fitting set forth in claim 1, wherein the pair of flanges includes a first pair of flanges adjacent the first end of the connecting body and a second pair of flanges adjacent the second end of the connecting body.

5. The trapeze hanger fitting set forth in claim 1, wherein the clip jaws are resiliently deflectable outward away from the connecting body axis.

6. The trapeze hanger fitting set forth in claim 1, wherein the strut connecting portion further includes a pair of alignment arms extending outward from adjacent either side edge margin of the connecting body in a second direction, opposite the first direction, that is generally transverse to the body axis.

7. The trapeze hanger fitting set forth in claim 6, wherein the alignment arms are resiliently deflectable inward toward the body axis.

8. The trapeze hanger fitting set forth in claim 1, wherein the rod securement portion extends outward from the connecting body in the first direction at a location adjacent the second end of the connecting body.

9. A trapeze hanger fitting comprising:
    a strut connecting portion configured for insertion into an open interior of a strut through an open longitudinal end of the strut to connect the trapeze hanger fitting to the strut, the strut connecting portion including
        a connecting body having opposite first and second ends defining a body axis therebetween, and opposite side edge margins extending between the opposite ends, the first end of the connecting body configured for insertion through the open longitudinal end of the strut, and
        a pair of flanges extending outward from adjacent either side edge margin of the connecting body in a first direction that is generally transverse to the body axis, wherein the pair of flanges are configured to engage an interior surface defining the open interior of the strut when the strut connecting portion is inserted into the open interior of the strut,
        a pair of alignment arms extending outward from adjacent either side edge margin of the connecting body in a second direction, opposite the first direction, that is generally transverse to the body axis; and
    a rod securement portion connected to the strut connecting portion and configured for securement to a rod to secure the trapeze hanger fitting to the rod, wherein the rod securement portion is configured to be disposed outside the open interior of the strut and longitudinally outward from the open longitudinal end of the strut when the strut connecting portion is inserted into the open interior of the strut.

10. The trapeze hanger fitting set forth in claim 9, wherein the alignment arms are resiliently deflectable inward toward the body axis.

11. A trapeze hanger system comprising:
a strut having an upper side, a lower side, an interior surface defining an open interior, and opposite open longitudinal ends leading to the open interior, wherein the upper side defines a continuous slot extending lengthwise of the body and into the interior of the body, wherein the lower side defines a fitting groove extending lengthwise of the body, wherein the strut has a lower internal rail defined by the interior surface of the lower side, wherein the strut has opposing left and right sides and opposing left and right internal rails defined by the interior surface of the left and right sides; and
a trapeze hanger fitting comprising:
a strut connecting portion configured for insertion into an open interior of a strut through an open longitudinal end of the strut to connect the trapeze hanger fitting to the strut, the strut connecting portion including
a connecting body having opposite first and second ends defining a body axis therebetween, and opposite side edge margins extending between the opposite ends, the first end of the connecting body configured for insertion through the open longitudinal end of the strut,
a pair of clip jaws extending outward from adjacent either side edge margin of the connecting body in a first direction that is generally transverse to the body axis, wherein the pair of clip jaws are configured to clip onto the internal rail when the strut connecting portion is inserted into the open interior of the strut, and
a pair of alignment arms extending outward from adjacent either side edge margin of the connecting body in a second direction, opposite the first direction, which is generally transverse to the body axis, wherein the pair of alignment arms are configured to engage the left and right internal rails when the strut connecting portion is inserted into the open interior of the strut; and
a rod securement portion connected to the strut connecting portion and configured for securement to a rod to secure the trapeze hanger fitting to the rod, wherein the rod securement portion is configured to be disposed outside the open interior of the strut and longitudinally outward from the open longitudinal end of the strut when the strut connecting portion is inserted into the open interior of the strut.

* * * * *